United States Patent [19]

Kogure et al.

[11] Patent Number: 5,342,901
[45] Date of Patent: Aug. 30, 1994

[54] FILM-FORMABLE, CHELATE-FORMING RESIN, PROCESS FOR PREPARATION THEREOF, USE THEREOF AND METHOD FOR FORMING ELECTROPHORETIC COATING

[75] Inventors: Hideo Kogure, Atsugi; Heihachi Murase, Kanagawa; Masafumi Kume, Hiratsuka, all of Japan

[73] Assignee: Kansai Paint Company, Limited, Amagasaki, Japan

[21] Appl. No.: 930,524

[22] PCT Filed: Feb. 5, 1992

[86] PCT No.: PCT/JP92/00113

§ 371 Date: Sep. 30, 1992

§ 102(e) Date: Sep. 30, 1992

[87] PCT Pub. No.: WO92/13902

PCT Pub. Date: Aug. 20, 1992

[30] Foreign Application Priority Data

Feb. 5, 1991 [JP] Japan .................... 3-102182
Feb. 13, 1991 [JP] Japan .................... 3-042475
Mar. 1, 1991 [JP] Japan .................... 3-035935

[51] Int. Cl.$^5$ .................... C08F 8/32; C08F 26/02
[52] U.S. Cl. .................... 525/330.5; 423/DIG. 14; 525/152; 525/326.5; 525/328.9; 525/329.1; 525/330.3; 525/330.6; 525/380; 525/384; 525/385; 526/312
[58] Field of Search .................... 525/330.5, 380, 330.6; 526/312

[56] References Cited

U.S. PATENT DOCUMENTS 3,872,047 3/1975 Jandourek .................... 525/286
4,725,568 2/1988 Parker .................... 502/159
5,055,356 10/1991 Minowa .................... 428/409

*Primary Examiner*—Fred Zitomer
*Attorney, Agent, or Firm*—Armstrong, Westerman, Hattori, McLeland & Naughton

[57] ABSTRACT

The invention provides a film-formable, chelate-forming resin having, per 1000 g of the resin, about 0.2 to about 3.5 moles of chelate-forming group represented by the formula [1], [2], [3] or [4]:

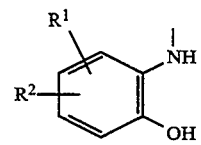

[1]

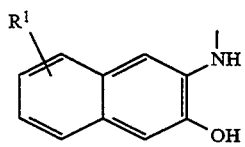

[2]

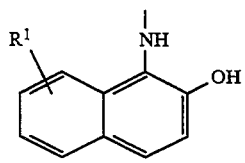

[3]

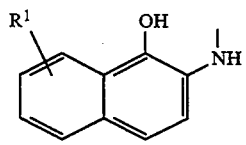

[4]

wherein $R^1$ and $R^2$ are the same or different and each represents a hydrogen atom, a halogen atom, a nitro group, a nitroso group, a cyano group, a hydrocarbon group having up to 18 carbon atoms, or an alkoxyalkyl group having up to 12 carbon atoms, and a process for preparing the resin.

The invention also provides a metal surface treating composition and a corrosion preventive coating composition both containing the above chelate-forming resin, and a chelate-forming resin composition comprising the resin and a crosslinking agent.

The invention further provides a method for forming an electrophoretic coating, comprising the steps of bringing the metal surface treating composition into contact with a metal surface before electrodeposition on the metal surface to accomplish pretreatment, and conducting electrodeposition on the pretreated metal surface.

7 Claims, No Drawings

FILM-FORMABLE, CHELATE-FORMING RESIN, PROCESS FOR PREPARATION THEREOF, USE THEREOF AND METHOD FOR FORMING ELECTROPHORETIC COATING

FIELD OF THE INVENTION

This invention relates to a novel, film-formable, chelate-forming resin, a process for preparing the same, the use thereof and a method for forming an electrophoretic coating.

BACKGROUND ART

Conventionally metals have been prevented from corrosion, for example, by treating the surface of metals, i.e. by forming an inorganic coating of phosphoric acid salt, chromic acid salt or the like over the metal surface, or by techniques for forming corrosion preventive coatings, i.e. by forming an organic coating of epoxy resin, phenol resin or the like over the metal surface.

However, the treatment of metal surfaces has the drawbacks of causing environmental pollution due to liquid wastes containing heavy metals, using poisonous chemicals such as acids, alkalis or cyano-containing compounds, and necessitating a complex process.

Corrosion preventive coatings have the problem that the bond strength between the coating and the metal is insufficient to completely prevent the corrosion reaction.

Accordingly, corrosion preventive techniques still remain to be established which are free of pollution, practically useful and excellent in corrosion preventive effects, and it has been desired to develop such techniques.

In application of coating on automotive bodies and electrical equipment, it is widely practiced to pretreat the surface of metal with the phosphoric acid salt, followed by application of an electrophoretic coating composition as a primer in view of resistance to corrosion on metal surfaces, adhesion between the metal surface and the coating, finishing appearance of coating, durability thereof, productivity thereof, etc.

In this case, while the electrophoretic coating composition is substantially pollution-free, the treatment with phosphoric acid salt entails the problems that the phosphorus in the liquid waste from the treatment process induces eutrophication of water, thereby polluting the water, and that a short supply of phosphorus is expected in future. Thus there is an urgent need for development of a novel pretreatment method which can replace the treatment with phosphoric acid salt.

DISCLOSURE OF THE INVENTION

An object of the present invention is to provide a novel film-formable, chelate-forming resin capable of forming a metal chelate complex firmly on the surface of metal to prevent the metal from corrosion, and a process for preparing the same.

Another object of the invention is to provide a novel metal surface treating composition and a novel corrosion preventive coating composition both containing a film-formable, chelate-forming resin which is free of pollution and excellent in corrosion resistance.

A further object of the invention is to provide a novel method for forming an electrophoretic coating which includes pretreatment to be effected prior to coating instead of conventional pretreatment with phosphoric acid salt.

These and other objects of the invention will become more apparent from the following description.

According to the present invention, there is provided a film-formable, chelate-forming resin having, per 1000 g of the resin, about 0.2 to about 3.5 moles of chelate-forming group represented by the formula [1], [2], [3] or [4]:

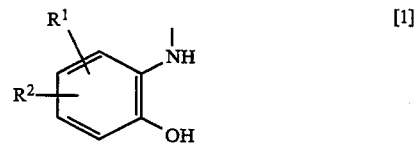

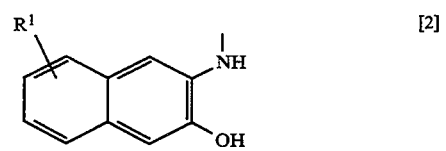

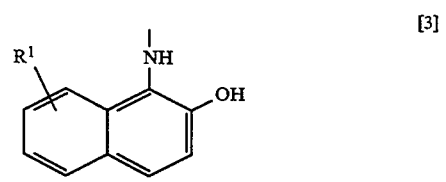

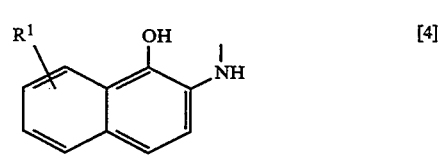

wherein $R^1$ and $R^2$ are the same or different and each represents a hydrogen atom, a halogen atom, a nitro group, a nitroso group, a cyano group, a hydrocarbon group having up to 18 carbon atoms, or an alkoxyalkyl group having up to 12 carbon atoms.

The present invention also provides a process for preparing the chelate-forming resin, comprising subjecting to addition reaction (i) a compound having an amino group and represented by the following formula [5], [6], [7] or [8] and (ii) a resin or a compound having a polymerizable double bond to attach the amino group to the polymerizable double bond:

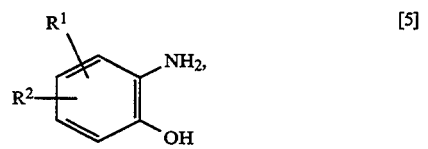

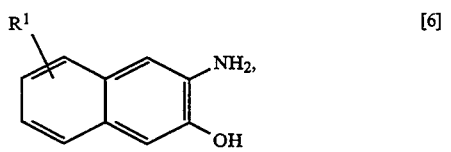

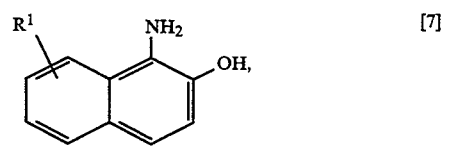

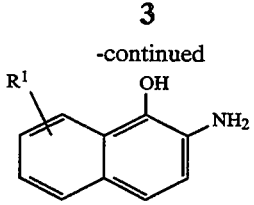

[8]

wherein R¹ and R² are as defined above.

The present invention also provides a metal surface treating composition and a corrosion preventive coating composition both containing the above chelate-forming resin, and a chelate-forming resin composition comprising the resin and a crosslinking agent.

The present invention further provides a method for forming an electrophoretic coating, comprising the steps of bringing said metal surface treating composition into contact with a metal surface before electrodeposition on the metal surface to accomplish pretreatment, and conducting electrodeposition on the pretreated metal surface.

In view of the foregoing situation of the prior art, the present inventors conducted research from the viewpoint of interface chemistry, thermodynamics, electrochemistry, complex chemistry and so on to develop a novel, pollution-free resin which is usable as a pollution-free surface treating composition in place of inorganic surface treating agents such as phosphoric acid salt, chromic acid salt or the like and which is superior in corrosion resistance to epoxy resins, phenol resins, etc. Directing attention to high-molecular-weight compounds capable of forming a chelate complex which bond to metals far more firmly than epoxy resins, phenol resins or like resins, the present inventors investigated chelate complex-forming high-molecular-weight compounds. The investigations gave the following findings.

(1) The chelate formed gives energy to bond the compound to the metal which energy is greater than the energy of corrosion reaction when introducing into the film-formable resin a specific amount of the above-specified chelate-forming group containing a nitrogen atom attached to the ortho position with respect to a phenolic hydroxyl group.

(2) Such chelate-forming resin serves to neutralize the charge of metal ion.

(3) Three-dimensional crosslink is afforded by the formation of chelate.

(4) The film formed from this resin is imparted an excellent corrosion resistance due to the factors as described above in (1) to (3).

(5) Such chelate-forming resin can be used to produce a pollution-free, highly corrosion-resistant metal surface treating agent and corrosion preventive coating composition.

(6) When the surface of metal is pretreated with the above metal surface treating agent, followed by coating the pretreated metal surface with an electrophoretic coating composition, the obtained electrophoretic coating has adhesion to a substrate and corrosion resistance which are comparable to or higher than coatings obtained by pretreatment with phosphoric acid salt.

The present invention has been accomplished based on these novel findings.

In the chelate-forming resin of the present invention, the hydrocarbon group represented by R¹ or R² in the chelate-forming group of the formulas (1) to (4) has up to 18 carbon atoms, preferably up to 5 carbon atoms. Such hydrocarbon group includes, for example, alkyl, cycloalkyl, aralkyl, aryl, etc. The alkoxyalkyl group represented by R¹ or R² has up to 12 carbon atoms, preferably up to 5 carbon atoms.

Given below are specific examples of alkyl, alkoxyalkyl, cycloalkyl, aralkyl and aryl which are represented by R¹ or R² in the chelate-forming group.

Alkyl groups may be straight- or branched-chain groups and include, for example, methyl, ethyl, n-propyl, isopropyl, n-butyl, n-hexyl, n-octyl, 2-ethylhexyl, n-dodecyl, n-octadecyl, etc.; alkoxyalkyl groups include, for example, 2-methoxyethyl, 3-methoxypropyl, etc.; cycloalkyl groups include, for example, cyclopentyl, cyclohexyl, 3-methylcyclohexyl, etc.; aralkyl groups include, for example, benzyl, 4-methylbenzyl, 4-isopropylbenzyl, phenethyl, etc.; and aryl groups include, for example, phenyl, diphenyl, naphthyl, 4-methylphenyl, etc.

Typical examples of chelate-forming groups represented by the formulas [1] to [4] are

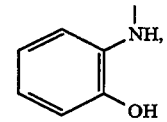

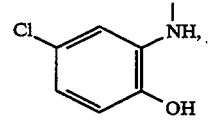

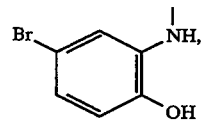

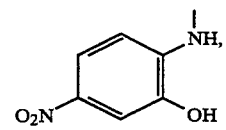

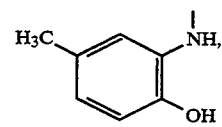

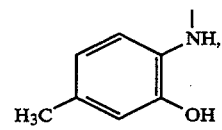

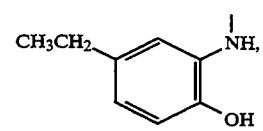

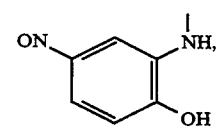

-continued

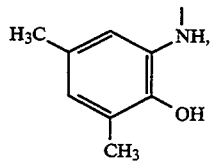

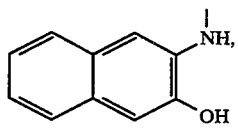

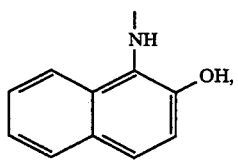

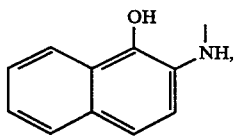

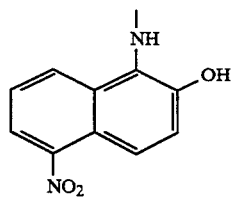

The chelate-forming group of the resin according to the invention is a portion which forms a chelate complex having a stable five-membered ring of the nonionic intramolecular complex with a positive bivalent or trivalent metal ion.

Models of chelate complexes to be formed are given below wherein the chelate-forming group is represented by

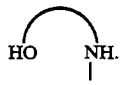

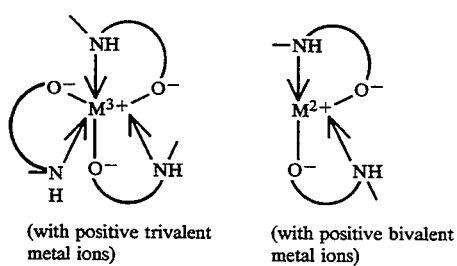

(with positive trivalent metal ions)   (with positive bivalent metal ions)

Thus, three chelate-forming groups combine with a positive trivalent metal ion or two chelate-forming groups combine with a positive bivalent metal ion to form a chelate complex of five-membered ring wherein the charge of the metal ion is neutralized with phenoxide ions. Since the chelate complex is formed with the charge neutralized and is nonionic, the resin is resistant to the flow of corrosion current which causes corrosion to metal. Furthermore, the complex is in the form of five-membered ring and is therefore structurally stable.

The chelate-forming resin of the invention is required to have about 0.2 to about 3.5 moles, preferably about 0.3 to about 3.0 moles, of chelate-forming group per 1000 g of the resin. The presence of chelate-forming group in this quantity range promotes three-dimensional development of resin film during the formation of chelate to give a firm chelate bond and increases the crosslink density of resin film, whereby excellent corrosion resistance is imparted.

The chelate-forming resin of the invention can be prepared by introducing a chelate-forming group into the resin, for example, by methods given below in (a) to (d). These methods are characterized in that addition reaction is performed between the compound of the formula [5], [6], [7] or [8] (hereinafter referred to as "the o-aminophenol analogue") and a resin or compound having a polymerizable double bond to attach the amino group of the former compound to the polymerizable double bond of the latter resin or compound.

(a) A method wherein a polymerizable double bond is introduced into a terminal position or side chain of a resin serving as a base resin and addition reaction is conducted between the o-aminophenol analogue and the resin to attach the amino group of the o-aminophenol analogue to the double bond of the resin.

(b) A method wherein addition reaction is made between the o-aminophenol analogue and a compound having a polymerizable double bond and a first functional group such as a hydroxyl group, carboxyl group or the like to attach the amino group of the o-aminophenol analogue to the polymerizable double bond, and the resulting reaction product is reacted with a polymer having a second functional group such as an isocyanate group, epoxy group or the like which is reactive with the first functional group of the reaction product.

(c) A method wherein a compound having a polymerizable double bond and a chelate-forming group of the formula [1], [2], [3] or [4] is prepared using the addition reaction product for use in the method (b) and a compound having a polymerizable double bond and a second functional group reactive with the first functional group of the reaction product by reacting the first and second functional groups, and then the obtained compound is copolymerized with another polymerizable unsaturated monomer which is copolymerizable with the compound.

(d) A method wherein addition reaction is conducted between the o-aminophenol analogue and a silane compound or resin having a polymerizable double bond and an etherified silanol group to attach the amino group of the o-aminophenol analogue to the polymerizable double bond, or wherein partial condensation reaction is made of a compound or resin having a structual portion of the formula [1], [2], [3] or [4] and an etherified silanol group obtained by this method or copolycondensation is effected between such compound or resin and another silane compound having an etherified silanol group.

The resin having a polymerizable double bond at a terminal position or side chain for use in the method (a) is not specifically limited and can be any of various resins obtained by known methods. Such resin can be prepared from a resin having an epoxy group at a terminal position or side chain (such as a copolymer of glycidyl (meth)acrylate, 3,4-epoxycyclohexylmethyl (meth- )acrylate, allyl glycidyl ether or like epoxy-containing polymerizable unsaturated monomer with another polymerizable monomer, or bisphenol-type or other epoxy resin) by reacting the carboxyl group of (meth)acrylic acid or like carboxyl-containing polymerizable unsaturated compound with the epoxy group of the resin to open the epoxy group for the introduction of polymerizable unsaturated group into the resin. The reaction can be accomplished, for example, by heating the two reactants at about 50° to about 115° C. for about 30 minutes to about 8 hours in the presence of a reaction catalyst such as a quaternary ammonium salt or a polymerization inhibitor such as hydroquinone.

Alternatively, an isocyanate compound containing a polymerizable unsaturated group, such as isocyanato ethyl (meth)acrylate, m-isopropenylphenyl isocyanate or m-isopropenyl-α,α-dimethylbenzyl isocyanate, can be reacted with a hydroxyl group of a resin having a hydroxyl group, such as acrylic resin, polyester resin, alkyd resin or epoxy resin, whereby the polymerizable unsaturated group can be introduced into the resin. The reaction can be also effected, for example, by reacting the resin and the compound at 20° to 100° C. for about 1 to about 10 hours in the presence of a tin catalyst such as dibutyltin octylate.

The above-obtained resin having a polymerizable double bond at a terminal position or side chain is reacted with the o-aminophenol analogue, whereby the chelate-forming group represented by the formula [1], [2], [3] or [4] is introduced into the resin. Representative examples of the o-aminophenol analogue of the formula [5], [6], [7] or [8] are o-aminophenol, 4-chloro-2-aminophenol, 4-bromo-2-aminophenol, 5-nitro-2-aminophenol, 4-methyl-2-aminophenol, 5-methyl-2-aminophenol, 4-ethyl-2-aminophenol, 2-amino-3-naphthol, 1-amino-2-naphthol, 2-amino-1-naphthol, etc. Among them, o-aminophenol is especially preferred. These compounds are usable singly or at least two of them can be used in mixture.

The addition reaction of the o-aminophenol analogue with the polymerizable double bond of the resin can be conducted, for example, at about 20° to about 100° C. for about 1 to about 24 hours in the presence of an acid catalyst.

The method (b) is the method (a) as practiced in a different order of reactions. The reaction product having a chelate-forming group represented by the formula [1], [2], [3] or [4] and a first functional group such as a hydroxyl group or carboxyl group is prepared first, and the first functional group of the reaction product is then reacted with the second functional group of the polymer to increase the molecular weight of the product.

The compound having a chelate-forming group represented by the formula [1], [2], [3] or [4] and a polymerizable double bond for use in the method (c) can be obtained, for example, by preparing an addition reaction product of the o-aminophenol analogue with a hydroxyl-containing unsaturated compound, such as 2-hydroxyethyl (meth)acrylate, and reacting the hydroxyl group of the product with a polymerizable double bond-containing monoisocyanate compound such as isocyanato ethyl (meth)acrylate, m-isopropenylphenyl isocyanate or m-isopropenyl-α,α-dimethylbenzyl isocyanate. The reaction of the o-aminophenol analogue with the hydroxyl-containing unsaturated compound is carried out, for example, by reacting the two reactants in equimolar amounts at about 20° to about 100° C. for about 1 to about 24 hours in the presence of an acid catalyst. The resulting addition reaction product has a hydroxyl group, and urethanation reaction between the product and monoisocyanate compound having a polymerizable double bond is conducted, for example, by reacting the two reactants in equimolar amounts at about 20° to about 100° C. for about 1 to about 10 hours in the presence of a tin catalyst.

The compound having a chelate-forming group of the formula [1], [2], [3] or [4] and a polymerizable double bond can be obtained by other methods.

Examples of other polymerizable unsaturated monomers for use in the method (c) for copolymerization with the compound having a chelate-forming group of the formula [1], [2], [3] or [4] and a polymerizable double bond are $C_1$ to $C_{18}$ alkyl esters of (meth)acrylic acid such as methyl (meth) acrylate, ethyl (meth) acrylate, n-butyl (meth) acrylate, isobutyl (meth) acrylate, hexyl (meth) acrylate, 2-ethylhexyl (meth) acrylate and lauryl (meth)acrylate; $C_2$ to $C_8$ hydroxyalkyl esters of (meth)acrylic acid such as 2-hydroxyethyl (meth)acrylate and hydroxypropyl (meth)acrylate, and hydroxyl-containing unsaturated monomers such as allyl alcohol; aromatic vinyl compounds such as styrene, α-methylstyrene and vinyltoluene; secondary or tertiary amino group-containing polymerizable unsaturated monomers such as dimethylaminoethyl (meth)acrylamide, dimethylaminopropyl (meth)acrylamide, dimethylaminoethyl (meth)acrylate and diethylaminopropyl (meth)acrylate; acid group-containing unsaturated monomers such as acrylic acid, methacrylic acid, crotonic acid, itaconic acid, maleic acid and fumaric acid; and other monomers such as vinyl acetate, (meth)acrylamide, (meth)acrylonitrile and N-methylol (meth)acrylamide butyl ether. These monomers can be used singly, or at least two of them are usable in combination.

The copolymerization of the compound having a chelate-forming group and a polymerizable double bond with the other polymerizable unsaturated monomer can be conducted by a polymerization method known per se, for example, by heating the two components in the presence of a polymerization catalyst, and preferably an organic solvent.

Examples of preferred silane compounds or resins having a polymerizable double bond and an etherified silanol group for use in the method (d) are silane compounds represented by the formula [9] given below, resins prepared by partial condensation of at least one of these silane compounds, and partial copolycondensation products prepared from such a silane compound and another silane compound having an etherified silanol group

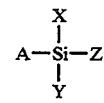
[9]

wherein A is an unsaturated hydrocarbon group or an unsaturated carbonyloxyalkyl group, X is a hydrogen atom, a hydrocarbon group having 1 to 18 carbon atoms, an alkoxyl group having 1 to 18 carbon atoms, an aryloxy group having 6 to 8 carbon atoms or an alicyclic hydrocarbonoxy group having 5 to 8 carbon atoms, and Y and Z are the same or different, may be the same as X and are each an alkoxyl group having 1 to 18 carbon atoms, an aryloxy group having 6 to 8 carbon atoms or an alicyclic hydrocarbonoxy group having 5 to 8 carbon atoms.

Examples of preferred groups A are vinyl, allyl, methacryloyloxyethyl, acryloyloxyethyl, methacryloyloxypropyl, acryloyloxypropyl and like groups.

Among the alkoxyl groups having 1 to 18 carbon atoms, aryloxy groups having 6 to 8 carbon atoms and alicyclic hydrocarbonoxy groups having 5 to 8 carbon atoms represented by X, Y and Z, preferable examples are methoxy, ethoxy, propoxy, butoxy, hexoxy, octoxy, methoxyethoxy and like alkoxyl groups having 1 to 8 carbon atoms, phenoxy group, cyclohexyloxy group and the like.

Preferable among the hydrocarbon groups represented by X and having 1 to 18 carbon atoms are methyl, ethyl, n-propyl, isopropyl, n-butyl, n-hexyl and like alkyl groups having 1 to 6 carbon atoms; phenyl, methylphenyl, ethylphenyl and like aryl groups having 6 to 8 carbon atoms; and cyclopentyl, cyclohexyl and like alicyclic hydrocarbon groups having 5 to 8 carbon atoms.

Representative examples of silane compounds represented by the formula [9] are vinyltrimethoxysilane, vinyltriethoxysilane, vinyltris(n-propoxy)silane, allyltrimethoxysilane, β-acryloyloxyethyltrimethoxysilane, γ-acryloyloxypropyltrimethoxysilane, γ-methacryloyloxypropyltrimethoxysilane, γ-methacryloyloxypropyl(methyldiethoxy)silane, γ-methacryloyloxypropyltriethoxysilane, β-methacryloyloxypropyltris(n-butoxy)silane, γ-methacryloyloxypropyltris(isopropoxy)silane, etc.

A silane compound having at least two etherified silanol groups is usable as the other silane compound having etherified silanol groups which can be subjected to partial copolycondensation with the silane compound represented by the formula (9). Examples of such compounds are tetraethoxysilane, methyltrimethoxysilane, methyltriethoxysilane, phenyltrimethoxysilane, phenyltriethoxysilane, isobutyltrimethoxysilane, ethyltrimethoxysilane, dimethyldimethoxysilane, diphenyldimethoxysilane and like silane compounds, partial polycondensation products of these silane compounds, etc.

The partial condensation of the silane compound(s) of the formula [9] and the partial copolycondensation of the silane compound of the formula [9] and the other silane compound having etherified silanol groups can be conducted by conventional methods for condensation of etherified silane compounds. Generally, these reactions are accomplished by reacting the reactants at room temperature to a temperature up to the boiling point, preferably at 50° to 90° C. in the presence of water and an acid such as acetic acid or like organic acid or hydrochloric acid or like inorganic acid. The amount of water is variable suitably according to the degree of condensation desired.

Addition reaction is effected between the o-aminophenol analogue and a silane compound or resin having a polymerizable double bond and an etherified silanol group, whereby a silane compound or resin is obtained which has a chelate-forming group of the formula [1], [2], [3] or [4] and an etherified silanol group. The addition reaction can be conducted, for example, by reacting the two reactants usually at about 20° to about 100° C. for about 1 to about 24 hours in the presence of an acid catalyst. The resin obtained by this method is included in the chelate-forming resins of the invention.

The chelate-forming resin of the invention can be obtained also by partial condensation of the silane compound or resin obtained by the above addition reaction, or by partial copolycondensation of the compound or resin and the other silane compound having etherified silanol groups. The partial condensation and partial copolycondensation can be carried out by the same method as the partial (copoly)condensation already stated.

The chelate-forming resins of the invention obtained by these methods (d) have an etherified silanol group, which reacts with water in the air for hydrolysis, forming a silanol group to effect crosslinking. Thus, the resins can be of the moisture curing type.

The resin prepared by the method (a), (b) or (c) can also be made curable with moisture by introducing an etherified silanol group into the resin. The etherified silanol group can be introduced into the resin, for example, by causing the resin to contain an alcoholic hydroxyl group, and reacting a monoisocyanate compound having an etherified silanol group with the hydroxyl group, for example, in the presence of a tin catalyst at about 20° to about 100° C. for about 1 to about 10 hours. Typical examples of monoisocyanate compounds having an etherified silanol group are γ-isocyanatopropyltrimethoxysilane, γ-isocyanatopropyltriethoxysilane and the like.

The chelate-forming resin of the invention may be one obtained by other methods than methods (a) to (d) and than modifications of these methods.

The chelate-forming resin of the present invention is required to have film-forming ability. It is suitable that the resin be preferably about 500 to 500000, more preferably about 700 to 200000, in number average molecular weight. The resin of the invention has critically about 0.2 to about 3.5 moles, preferably about 0.3 to about 3.0 moles, of chelate-forming group, per 1000 g of the resin. The resin of the invention has preferably at least one chelate-forming group per molecule, more preferably 3 to 700 chelate-forming groups, per molecule.

As already stated, various base resins are usable for preparing the chelate-forming resins of the invention. Examples of such resins are acrylic resins, epoxy resins, polyester resins, alkyd resins, silicon-containing resins, etc. in view of film-forming ability.

The resin of the invention may be used as diluted with an organic solvent, or as dispersed or dissolved in water. In dissolving or dispersing the resin in water, an amino group or like basic group or carboxyl or like acid group is introduced into the resin and the group is neutralized, whereby the resin is dissolved or dispersed in water. When an amino group or like basic group is neutralized, the amount of basic group in the resin may be adjusted to an amine value of 30 to 130 mg KOH per gram of resin, and the basic group may be neutralized with formic acid, acetic acid, propionic acid, lactic acid or like organic acid or hydrochloric acid, sulfuric acid, phosphoric acid or like inorganic acid. When a carboxyl or like acid group is neutralized, the amount of acid group in the resin may be adjusted to an acid value of 30 to 130 mg KOH per gram of resin, and the acid group may be neutralized with organic amine, ammonia or like basic group.

In neutralization of amino group introduced into the resin, the amino group to be introduced may be a group of the o-aminophenol analogue which is used for forming a chelate-forming group or a group of a combination of the o-aminophenol analogue and other amino group-containing compound.

Examples of amino group-containing compounds other than the o-aminophenol analogue are aliphatic, alicyclic or aromatic-aliphatic primary or secondary amines (which can form an amino group on reaction with epoxy group), tertiary aminomonoisocyanate obtained by reaction of tertiary amino alcohol with diisocyanate (which can introduce an amino group into the resin on reaction with the hydroxyl group in the resin), a polymerizable unsaturated monomer having a secondary or tertiary amino group (which, for example, can introduce an amino group into the resin by copolymerization in the method (c)), etc.

Examples of the primary or secondary amine are given below.

(1) Primary monoamines such as methylamine, ethylamine, n- or iso-propylamine, monoethanolamine, n- or iso-propanolamine, etc.

(2) Secondary monoamines such as diethylamine, diethanolamine, di-n- or di-iso-propanolamine, N-methylethanolamine, N-ethylethanolamine, etc.

(3) Primary or secondary polyamines such as ethylenediamine, diethylenetriamine, hydroxyethylaminoethylamine, ethylaminoethylamine, methylaminopropylamine, dimethylaminoethylamine, dimethylaminopropylamine, etc.

When an epoxy group is present in the resin, these primary or secondary amines may be each reacted, as it is, with the epoxy group. Generally when a primary amine or a secondary amine such as N-hydroxyalkylamine is used, the amine is reacted, for example, at an elevated temperature of about 100° to about 230° C. with ketone, aldehyde or carboxylic acid for conversion into aldimine, ketimine, oxazoline or imidazoline which is preferably used. The primary amine, secondary amine or the reaction product of amine is reacted with the epoxy group of the resin, for example, with heating at about 80° to about 200° C. for about 2 to about 5 hours.

When a polymerizable unsaturated group is present in the resin, an amino group can be introduced in the resin by addition reaction to attach the primary amine to the polymerizable unsaturated group. This addition reaction can be conducted, for example, by reacting the reactants at about 20° to about 100° C. in the presence of an acid catalyst for about 1 to 24 hours.

When tertiary aminomonoisocyanate is used as an amino group-containing compound, the compound may be reacted, for example, with an alcoholic hydroxyl group in the resin at about 30° to about 120° C. until the absorption of isocyanate group completely disappears in infrared absorption spectrum.

For introduction of an amino group into the resin using a polymerizable unsaturated monomer having a secondary or tertiary amino group, a polymerizable unsaturated monomer having a secondary or tertiary amino group, for example, may be used to substitute for part or the whole of other polymerizable unsaturated monomer to be copolymerized with the compound having a chelate-forming group of the formula (1) and a polymerizable double bond in the method (c).

In the neutralization of acid group introduced into the resin, acid groups to be introduced include, for example, a carboxyl group, a sulfonic acid group, a phosphoric acid group and so on.

The acid group may be introduced into the resin, for example, by introducing an epoxy group into the resin and reacting the epoxy group with a polybasic acid containing the acid group in a molar quantity which is excessive in respect to the epoxy group. Examples of useful polybasic acids are phthalic acid (anhydride), isophthalic acid, terephthalic acid, hexahydrophthalic acid, succinic acid, glutaric acid, adipic acid, maleic acid (anhydride), fumaric acid, trimellitic acid (anhydride), pyromellitic acid, etc.

The acid group can be introduced into the resin by other methods, for example, by methods in which the unsaturated monomer containing the acid group is used to substitute for part or the whole of other polymerizable unsaturated monomer to be copolymerized with the compound having a chelate-forming group and a polymerizable double bond in the method (c), or by methods in which the resin is caused to contain a polymerizable double bond, and addition reaction is effected between the double bond and a thiosalicylic acid, thioglycollic acid or like thiocarboxylic acid having a thiol group to attach the latter to the former.

According to the invention, a reactive group such as a hydroxyl group can be introduced into the resin of the invention in addition to the chelate-forming group so that the obtained resin is used in combination with a crosslinking agent reactive with the introduced reactive group. In the case where the reactive group is, for example, hydroxyl, the resin can be crosslinked at room temperature or by heating using as the crosslinking agent a known one such as a polyisocyanate compound, blocked polyisocyanate compound, aminoplast resin, i.e., a condensation product of urea, melamine, benzoguanamine or like nitrogen-containing compound with formaldehyde, or a lower alkyletherified product of the condensate (with $C_1$ to $C_4$ alkyl). When an aminoplast resin is used as the crosslinking agent, the resin may be used in combination with a curing catalyst such as p-toluenesulfonic acid, dodecylbenzenesulfonic acid, dinonylnaphthalenesulfonic acid or a neutralization product of these acids with amine. When a polyisocyanate compound is used as the crosslinking agent, the compound may be used in combination with a curing catalyst such as tin octylate, dibutyltin dilaurate, dibutyltin oxide, dioctyltin oxide, lead 2-ethylhexanoate or like metal compound. The resin may be rendered self-crosslinkable by introducing hydroxyl groups into the resin and reacting some of hydroxyl groups with a diisocyanate compound having a blocked isocyanate group to introduce the blocked isocyanate group into the resin.

A composition which is curable by irradiation with active rays such as electron rays, ultraviolet rays or the like can be prepared by introducing a polymerizable unsaturated group into the resin and admixing the resin of the invention with a polymerizable unsaturated vinyl monomer and optionally a photopolymerization initiator. Useful polymerizable unsaturated vinyl monomers include those conventional in the art, such as other polymerizable unsaturated monomers above-exemplified for use in the method (c), ethylene glycol di(meth)acrylate, trimethylolpropane tri(meth)acrylate, and like polyfunctional monomers. The polymerizable unsaturated group can be introduced into the resin as by introducing an epoxy group into the resin and conducting addition reaction between the resulting resin and a carboxyl-containing polymerizable unsaturated compound to attach the group to the resin.

The resin of the invention may be made into either an organic solvent composition or an aqueous composition. In preparing the compositions, the resin is used alone or in combination with a crosslinking agent, a vinyl monomer and the like and optionally a pigment, a surface adjusting agent, an oxidant and so on to give a metal surface treating composition or a corrosion preventive coating composition. The metal surface treating composition is applied to the surface of metal to form a thin film thereon which contributes to prevention of corrosion. The metal surface treating composition or a corrosion preventive coating composition is applied to substrates by spray coating, brush coating, roller coating, dip. coating, cationic or anionic electrophoretic coating, self-deposition by dipping, silk-screen printing or like method to a thickness of generally 0.1 to 50 μm on dry basis and dried for curing. The film has a dry thickness preferably in the range of about 0.1 to about 5 μm for metal surface treatment or about 1 to about 50 μm against corrosion. Substrates to be coated have the surface of a metal such as iron, zinc, copper, aluminum or the like or have such a surface treated with chromic acid salt, a phosphoric acid salt or the like.

The resin of the invention is highly resistant to corrosion on metals such as iron, zinc, copper, aluminum or the like which produce a positive bivalent or positive trivalent metal ion on corrosion. Further, the resin of the invention is free of pollution. With these advantages, the resin is very useful as a metal surface treating composition or a corrosion preventive coating composition.

Next, the method of the invention for forming an electrophoretic coating will be described below. According to the method of the invention, the electrodeposition is performed on the metal surface pretreated by bringing the metal surface treating composition containing the chelate-forming resin of the invention into contact with a metal surface.

The metal surface treating composition for use as a pretreating agent in the method of the invention for forming an electrophoretic coating may be in the form of either the organic solvent type or the aqueous type containing the chelate-forming resin, and may contain various optional components such as a crosslinking agent and the like.

When required, the pretreating agent for use in the invention may further contain an oxidant such as sodium chlorate and nitrous acid, an etching auxiliary agent such as ethylenediaminetetraacetate, etc. The concentration of the chelate-forming resin in the pretreating agent is preferably in the range of 0.1 to 10% by weight, more preferably in the range of 0.5 to 5% by weight. The pretreating agent is brought into contact with a metal surface by dip coating, spray coating, roller coating, brush coating, spin coating, squeeze coating or like coating methods to form a film, whereby the metal surface is pretreated for electrodeposition. Substrates to be pretreated have the surface of a metal such as iron, zinc, copper, aluminum or the like or have such a surface which is subjected to a chemical conversion treatment, such as treatments with phosphate, chromate or boehmite, anodic oxidation treatment, etc.

According to the coating method of the invention, an electrophoretic coating is applied to the metal surface pretreated. The electrophoretic coating compositions for use in this electrodeposition may be either cationic or anionic, and can be any of such compositions conventionally used in the art of electrodeposition.

Representative examples of cationic electrophoretic coating compositions for use herein are those containing as a resin component a polyamine resin, typically an addition reaction product of epoxy resin with amine. Such addition reaction products include:

(i) addition reaction products of a polyepoxide compound with primary monoamine or polyamine, secondary monoamine or polyamine, or a mixture of primary and secondary polyamines (e.g. see the specification of U.S. Patent No.3984299); (ii) addition reaction products of a polyepoxide compound with secondary monoamine or polyamine having a ketiminized primary amino group (e.g. see the specification of U.S. Pat. No. 4017438); and (iii) a reaction product prepared by etherifying a polyepoxide compound and a hydroxy compound having a ketiminized primary amino group (e.g. see Japanese Unexamined Patent Publication No.43013/1984).

Polyepoxide compounds useful in the preparation of the above polyamine resins are compounds having at least two epoxy groups in the molecule and suitably a number average molecular weight of generally at least 200, preferably 400 to 4000, more preferably 800 to 2000. Especially preferred among them is a reaction product of a polyphenol compound with epichlorohydrin.

Polyphenol compounds usable in the preparation of the polyepoxide compound include, for example, bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2,-ethane, 4,4'-dihydroxydiphenylsulfone, phenol novolak, cresol novolak, etc.

Useful polyepoxide compounds include, for example, reaction products prepared by partial reaction of polyepoxide compound with polyol, polyetherpolyol, polyesterpolyol, polyamideamine, polycarboxylic acid, polyisocyanate compound or the like; and polymers prepared by graft polymerization of polyepoxide compound and ε-caprolactone, acryl monomer or the like.

In the case wherein the electrophoretic coating is required to have a good weatherability, it is expedient to use a weather-resistant amino group-containing acrylic resin or nonionic acrylic resin alone or in combination with the addition reaction product of epoxy resin with amine.

When required, the addition reaction product of epoxy resin with amine can be cured optionally with a polyisocyanate compound blocked with alcohol or the like.

It is possible to use an addition reaction product of epoxy resin with amine which can be cured without use of a blocked isocyanate compound. Useful such resins include, for example, a resin having β-hydroxyalkylcarbamate group introduced into a polyepoxide substance (for example, see Japanese Unexamined Patent Publication No.155470/1984) and a resin which is curable by ester exchange reaction (for example, see Japanese Unexamined Patent Publication No. 80436/1980).

The cationic aqueous solution or dispersion of the resin for use as the cationic electrophoretic coating composition can be prepared usually by neutralizing the resin with formic acid, acetic acid, lactic acid or like water-soluble organic acid to dissolve or disperse the resin in water.

Typical anionic electrophoretic coating compositions for use herein are those containing as a resin component a polycarboxylic acid resin, saturated or unsaturated alkyd resin containing, e.g. a carboxyl group, or oil-modified such resin, carboxyl-containing acrylic resin, maleinized polybutadiene resin or the like. The polycarboxylic acid resin can be cured, when required, with a blocked polyisocynate compound, melamine resin, urea resin or like amino resin.

The anionic aqueous solution or dispersion of the resin useful for the anionic electrophoretic coating composition can be prepared usually by neutralizing the resin with a basic substance, i.e. an organic amine or ammonia to dissolve or disperse the resin in water.

The aqueous solution or dispersion of the resin for cationic or anionic electrophoretic coating composition may be optionally admixed with conventional additives for coating compositions. Useful additives include, for example, coloring pigments such as titanium white, carbon black, red iron oxide and chrome yellow; extender pigments such as talc, calcium carbonate, mica, clay and silica; corrosion inhibitive pigments such as strontium chromate, zinc chromate and like chromic pigments, basic lead silicate and like lead pigments; and other additives. Other additives include, for example, dispersion auxiliary agents (e.g. nonionic surfactants); cissing preventive agents (e.g. acrylic resin, fluorine-containing resin and silicone resin); curing accelerators (e.g. salts of lead, bismuth, tin and like metals); and particulate organic polymers (e.g. acrylic resin type) having a particle size of 0.01 to 0.5 $\mu$m which are useful for improving properties of coating on an end face of substrate; and so on.

In the coating method of the invention, the pretreating agent is brought into contact with the metal surface by dip coating or like method to coat the metal surface with a film of the pretreating agent with a thickness of about 0.01 to about 5 $\mu$m, preferably about 0.1 to about 3 $\mu$m when dried, and is cured optionally with heating or the like after which the cationic or anionic electrophoretic coating composition is applied to the metal surface thus pretreated. The pretreating agent applied may be cured before electrodeposition or cured together with the applied electrophoretic coating composition after electrodeposition.

The cationic electrodeposition may be conducted on the metal surface thus pretreated, generally using an electrodeposition bath prepared by diluting a cationic electrophoretic coating composition with deionized water or the like to a solids concentration of about 5 to about 40% by weight and adjusting the pH to 5.5 to 8.0.

The cationic electrodeposition can be carried out by methods and with apparatus per se known and employed in conventional cationic electrodeposition techniques. The conditions for cationic electrodeposition in the invention are not specifically limited and may be as follows: a bath temperature of 15° to 35° C. (preferably 20° to 30° C.), a voltage of 100 to 400 V (preferably 200 to 300 V), a current density of 0.01 to 3 A/dm$^2$, electricity feeding time of 30 seconds to 10 minutes, an electrode area ratio (A/C) of 6/1 to 1/6, a distance between the electrodes in the range of 10 to 100 cm, and preferably with stirring. Expediently the thickness of electrophoretic coating (on dry basis) is 5 to 70 $\mu$m, preferably 10 to 50 $\mu$m. The electrophoretic coating composition applied is cured by heating to higher than the cure-initiating temperature, preferably 100° to 250° C., more preferably 150° to 200° C., without washing with water or after washing with deionized water, a filtrate passed through a reverse osmosis membrane or the like.

The anionic electrodeposition is conducted on the metal surface pretreated above, generally using an electrophoretic bath prepared by diluting the anionic electrophoretic coating composition with deionized water or the like to a solids concentration of 5 to 40% by weight and adjusting the pH to 7 to 9.

The anionic electrodeposition is carried out by methods and with apparatus per se known and employed in conventional anionic electrodeposition techniques. The conditions for anionic electrodeposition in the invention are not specifically limited and may be as follows: application of direct current at a voltage of 15 to 300 V for 30 to 300 seconds. Expediently the thickness of anionic electrophoretic coating (on dry basis) is 3 to 70 $\mu$m, preferably 5 to 50 $\mu$m. The electrophoretic coating composition applied is cured by heating to higher than the cure-initiating temperature, preferably 100° to 250° C., more preferably 150° to 200° C., without or after washing with water.

In the coating method of the invention, it is preferable from the viewpoint of safety and sanitary consideration to use an aqueous pretreating agent prepared by neutralization of amino group which is present in the chelate-forming group of chelate-forming resin in the pretreating agent. Cationic electrodeposition is preferable from the viewpoint of preventing the corrosion of the electrophoretic coating per se.

The electrophoretic coating thus obtained by the coating method of the invention can be used as it is or another coating composition may be further applied thereto. The coating system in this case is not specifically limited and includes, for example, a system of electrophoretic coating/top coating, a system having therebetween an intercoating, a chipping primer, a stone-guard primer or like primer, etc.

The coating method of the invention employs a novel pretreating agent containing a chelate-forming resin having the specific chelate-forming group derived from the o-aminophenol analogue. The coating of the agent exhibits high corrosion resistance on metals such as iron, zinc, copper, aluminum and the like which produce a positive divalent or positive trivalent metal ion on corrosion because the chelate-forming group of the resin in the coating can form a chelate complex having a stable five-membered ring of the nonionic intramolecular complex with a positive bivalent or trivalent metal ion.

The coating formed by the pretreatment of the invention is equivalent or superior in electrodeposition characteristic to coatings given by conventional treatments with zinc phosphate and is unlikely to deteriorate in properties during electrodeposition. The coating formed by the pretreatment of the invention can overcome the issue of water pollution due to the phosphorus from the treatment with phosphoric acid salt, and thus is pollution-free. In short, a combination of the pretreatment of the invention and electrodeposition process provides a substantially pollution-free, highly corrosion-resistant coating system of surface treatment/electrophoretic coating.

BEST MODE FOR CARRYING OUT THE INVENTION

The present invention will be described below in more detail with reference to Examples given below wherein the parts and percentages are all by weight unless otherwise specified.

Examples Illustrating the Preparation of Resins of the Invention Having a Chelate-forming Group of the Formula [1]

EXAMPLE 1

A 109 parts quantity of o-aminophenol, 58 parts of N,N-dimethylformamide and 0.1 part of hydroquinone were placed into a flask and heated to 70° C. with stirring to dissolve the o-aminophenol. The solution was maintained at 70° C. To the solution was added dropwise a mixture of 72 parts of acrylic acid and 2.3 parts of copper acetate serving as an addition reaction catalyst over a period of 2 hours. After the addition, the mixture was heated to 90° C. and reacted at the same temperature for 3 hours, giving an adduct solution.

Admixed with the solution were 220 parts of a mixture, previously prepared, of 190 parts of EPIKOTE 828 (trademark for epoxy resin manufactured by Shell Chemical, Co., Ltd. with an epoxy equivalent of about 190) and 30 parts of methyl isobutyl ketone, 1.0 part of tetraethylammonium bromide, 150 parts of isobutyl alcohol and 129.4 parts of methyl isobutyl ketone. The mixture was heated to 110° C. and reacted for 4 hours at the same temperature to obtain a solution of chelate-forming resin with a solids content of 50%. The obtained resin had an acid value of less than 1.0. The concentration of the chelate-forming group in the resin was 2.70 moles/kg (resin solids). The resin had a number average molecular weight of about 700.

EXAMPLE 2

Twenty parts of isopropyl alcohol and 25 parts of butyl acetate were placed into a flask and heated and maintained at 85° C. To the mixture was added dropwise a monomer mixture of 50 parts of glycidyl methacrylate, 30 parts of hydroxyethyl methacrylate, 20 parts of styrene and 2 parts Of azobisvaleronitrile over a period of 2 hours.

After the addition, the mixture was maintained at 85° C. for 2 hours and 0.1 part of hydroquinone was added to remove the solvent. Twenty parts of the solvent was distilled off, giving a resin solution (A) having a solids content of 80%.

Into another flask were placed 28.6 parts of n-butyl alcohol, 1 part of tetraethylammonium bromide and 25 parts of acrylic acid. The mixture was maintained at 110° C. by heating while air was blown thereinto. To the mixture was added dropwise 125 parts of the above-obtained resin solution with a solids content of 80% over a period of 2 hours. After the addition, the mixture was maintained at the same temperature for 3 hours, giving an adduct solution (B) having a polymerizable unsaturated group. The solution was cooled to 60° C. and mixed with 43 parts of 5-methyl-2-aminophenol, 22 parts of dimethylformamide, 0.5 part of copper octylate and 2 parts of trichloroacetic acid. The mixture was subjected to addition reaction at 60° C. for 8 hours to attach the amino group of 5-methyl-2-aminophenol to the polymerizable unsaturated group of the adduct. Methyl isobutyl ketone (88.9 parts) was added, giving a solution of chelate-forming resin having a solids content of 50%. The concentration of the chelate-forming group in the resin was 2.08 moles/kg (resin solids). The resin had a number average molecular weight of about 40000.

EXAMPLE 3

Forty-four parts of 4-methyl--2-aminophenol, 20 parts of methyl isobutyl ketone, 37 parts of 2-hydroxyethyl acrylate and 1.6 parts of formic acid were placed into a flask and heated to 90° C. The mixture was reacted at the same temperature for 5 hours. The reaction mixture was heated to distill off the formic acid under reflux of methyl isobutyl ketone and was cooled. Methyl isobutyl ketone (109 parts) was added, giving a solution of hydroxyl-containing chelate compound.

Fifty parts of methyl isobutyl ketone was placed into another flask and maintained at 85° C. with heating. Into the flask was placed dropwise a mixture of 50 parts of isocyanatoethyl methacrylate, 30 parts of isobutyl acrylate, 20 parts of styrene and 2 parts of 2,2'-azobisisobutyronitrile over a period of 2 hours while feeding nitrogen gas. After the addition, the mixture was maintained at the same temperature for 2 hours, giving a solution of isocyanate group-containing acrylic resin. To the solution was added 210 parts of the hydroxyl-containing chelate compound solution obtained above. The mixture was reacted at 70° C. for 2 hours, giving a solution of chelate-forming resin having a solids content of 50%. The concentration of the chelate-forming group in the resin was 1.98 moles/kg (resin solids). The resin had a number average molecular weight of about 30000.

EXAMPLE 4

A 154 parts quantity of 5-nitro-2-aminophenol, 72 parts of acrylic acid, 97 parts of methyl isobutyl ketone and 1.5 parts of hydroquinone were placed into a flask and reacted at 90° C. for 4 hours, producing a carboxyl-containing adduct solution. To the solution were added 142 parts of glycidyl methacrylate, 3.7 parts of tetraethylammonium bromide and 0.1 part of N-nitrosodiphenylamine while air was blown thereinto. The mixture was reacted at 110° C. for 3 hours, giving a solution of chelate-forming group-containing polymerizable unsaturated monomer.

Into another flask were placed 149.4 parts of butyl acetate and 230 parts of methyl isobutyl ketone. The mixture was maintained at 85° C. with heating. Added dropwise was a mixture of 470.3 parts of the solution of chelate-forming group-containing polymerizable unsaturated monomer obtained above, 130 parts of hydroxyethyl methacrylate, 158.6 parts of methyl acrylate, 79.5 parts of acrylonitrile and 9 parts of azobisvaleronitrile over a period of 2 hours while feeding nitrogen gas. After the addition, the mixture was maintained at the same temperature for 2 hours, giving a solution of chelate-forming resin having a solids content of 60%. The concentration of the chelate-forming group in the resin was 1.36 moles/kg (resin solids). The resin had a number average molecular weight of about 14000.

EXAMPLE 5

Into a flask were placed 143.5 parts of 4-chloro-2-aminophenol, 72 parts of formic acid, 92.4 parts of tetrahydropyran, 0.2 part of hydroquinone and 150 parts of γ-methacryloyloxypropyltrimethoxysilane. The mixture was reacted at 80° C. for 4 hours, giving a solution of chelate-forming group-containing silane. To the solution were added 951.6 parts of toluene, 680 parts of methyltrimethoxysilane and 324 parts of deionized water. The mixture was subjected to condensation reaction on hydrolysis at 80° C. for 2 hours. The reaction mixture was heated to 118° C. for 2 hours to remove the solvent, whereby 965.5 parts of the solvent was distilled off, giving a solution of chelate-forming resin having a solids content of 50%. The concentration of the chelate-forming group in the resin was 1.38 moles/kg (resin solids). The resin had a number average molecular weight of about 12000.

EXAMPLE 6

A 67 parts quantity of methyl isobutyl ketone and 111 parts of isophorone diisocyanate were placed into a flask. While maintaining the reaction temperature at 30° to 35° C., a mixture of 46 parts of methyl ethyl ketoxime and 25 parts of methyl isobutyl ketone was added dropwise, giving a solution of partially blocked polyisocyanate.

Into another flask were placed 200 parts of Denacol EX 521 (trademark for polyolpolyglycidyl ether manufactured by Nagase Kasei Co., Ltd. with a number average molecular weight of 1200 and an epoxy equivalent of about 200), 118 parts of methyl isobutyl ketone, 76 parts of acrylic acid, 2.5 parts of tetraethylammonium bromide and 0.3 part of hydroquinone. The mixture was heated to 110° C. for 3 hours to react the epoxy group with the carboxyl group, giving a solution of polymerizable unsaturated group- and hydroxyl-containing resin. The solution was mixed with 249 parts of the partially blocked polyisocyanate solution obtained above and the mixture was reacted at 70° C. for 3 hours to introduce a blocked isocyanate group into the resin. Added thereto were 91 parts of o-aminophenol, 37.5 parts of oxalic acid, 17.5 parts of diethanolamine and 43 parts of isopropanol. The mixture was reacted at 70° C. for 3 hours, giving a solution of chelate-forming group-containing resin having a solids content of 50%. The concentration of the chelate-forming group in the resin was 1.54 moles/kg (resin solids). The resin had a number average molecular weight of about 3000.

EXAMPLE 7

Four parts of the solution of chelate-forming resin with a solids content of 50% obtained in Example 1 was admixed with 0.7 part of Sumimal M55 (trademark for melamine resin manufactured by Sumitomo Chemical Co., Ltd.), 60 parts of methyl isobutyl ketone, 25 parts of ethanol, 9.8 parts of water and 0.5 part of citric acid, giving a surface treating composition A.

EXAMPLE 8

A coating composition B was prepared by admixing parts of the solution of chelate-forming resin having a 35 solids content of 50% and obtained in Example 1 with 11 parts of Sumimal M55, 24 parts of methyl isobutyl ketone, 28 parts of isopropanol and 2 parts of water.

EXAMPLE 9

A surface treating composition C was prepared by admixing 4 parts of the solution of chelate-forming resin having a solids content of 50% and obtained in Example 2 with 0.7 part of Sumimal M55, 60 parts of methyl isobutyl ketone, 25 parts of ethanol, 9.8 parts of water and 0.5 part of citric acid.

EXAMPLE 10

A coating composition D was prepared by admixing 35 parts of the solution of chelate-forming resin having a solids content of 50% and obtained in Example 2 with 11 parts of Sumimal M55, 24 parts of methyl isobutyl ketone, 28 parts of isopropanol and 2 parts of water.

EXAMPLE 11

A surface treating composition E was prepared by admixing 10 parts of the solution of chelate-forming resin having a solids content of 50% and obtained in Example 3 with 60 parts of methyl isobutyl ketone, 20 parts of toluene, 8 parts of ethanol and 2 parts of a 1% aqueous solution of formic acid.

EXAMPLE 12

A coating composition F was prepared by admixing 50 parts of the solution of chelate-forming resin having a solids content of 50% and obtained in Example 3 with 20 parts of methyl isobutyl ketone, 20 parts of isobutanol, 9 parts of ethanol and 1 part of a 0.5% aqueous solution of citric acid.

EXAMPLE 13

A surface treating composition G was prepared by admixing 8.5 parts of the solution of chelate-forming resin having a solids content of 60% and obtained in Example 4 with 1.2 parts of isophorone diisocyanate, 40 parts of methyl isobutyl ketone, 10 parts of toluene and 40 parts of butyl acetate.

EXAMPLE 14

A coating composition H was prepared by admixing 34 parts of the solution of chelate-forming resin having a solids content of 60% and obtained in Example 4 with 5 parts of isophorone diisocyanate, 30 parts of methyl isobutyl ketone, 20 parts of toluene and 10 parts of butyl acetate.

EXAMPLE 15

A surface treating composition I was prepared by admixing 10 parts of the solution of chelate-forming resin having a solids content of 50% and obtained in Example 5 with 70 parts of isobutyl alcohol, 5 parts of ethanol and 15 parts of toluene.

EXAMPLE 16

Toluene (30 parts), 40 parts of methyl isobutyl ketone and 30 parts of butyl acetate were placed into a flask and maintained at 100° C. with heating. To the mixture was added dropwise a mixture of 20 parts of γ-methacryloyloxypropyltrimethoxysilane, 60 parts of methyl methacrylate, 20 parts of isobutyl methacrylate and 2 parts of 2,2′-azobisisobutyronitrile over a period of 2 hours. After the addition, the mixture was maintained at the same temperature for 2 hours and 1 part of 2,2′-azobisisobutyronitrile was added. The mixture was maintained at 100° C. for 1 hour, giving a solution of moisture-curable acrylic resin having a solids content of 50%.

The obtained solution of moisture-curable acrylic resin (10 parts) was admixed with 100 parts of titanium white, 30 parts of ethanol, 20 parts of methyl isobutyl ketone and 15 parts of toluene. The mixture was dispersed, giving a paste of white pigment 60% in solids content.

A coating composition J was prepared by uniformly mixing together 105 parts of the above-obtained white pigment paste, 100 parts of the chelate-forming resin solution having a solids content of 50% and obtained in Example 5, 94 parts of the above-obtained moisture-curable acrylic resin solution, 50 parts of ethanol, 100 parts of methyl isobutyl ketone and 51 parts of toluene.

EXAMPLE 17

A self-depositing type surface treating composition K was prepared by gradually adding with stirring 20 parts of the chelate-forming resin solution having a solids content of 50% and obtained in Example 6 to a mixture of 79.5 parts of a 7% aqueous solution of formic acid and 0.5 part of sodium chlorate and homogeneously mixing them.

EXAMPLE 18

A coating composition L was prepared by gradually adding with stirring 40 parts of the chelate-forming resin solution having a solids content of 50% and obtained in Example 6 to 60 parts of a 0.2% aqueous solution of formic acid and homogeneously mixing them.

Test Examples 1 to 6

The surface treating compositions A, C, E, G, I and K prepared above in Examples 7, 9, 11, 13, 15 and 17 were applied to the substrates listed below in Table 1 to a thickness of 0.5 μm on dry basis and air-dried.

In Test Example 6 using the surface treating composition K, a substrate was immersed in the composition K, whereby the composition was self-deposited on the substrate, giving a coating of the surface treating composition. In Test Examples 1 to 5, the surface treating compositions were applied by bar coater.

Top coating compositions were applied to the thus coated substrates and dried to form top coatings. In Test Examples 1, 2, 3 and 6, an epoxy/melamine coating composition (abbreviated to "EP/ME" in Table 1) was applied to a thickness of about 40 μm on dry basis and baked at 140° C. for 30 minutes for curing. In Test Example 4, a urethane-based white enamel coating composition (abbreviated to "urethane" in Table 1) was applied to a thickness of 20 μm on dry basis and dried at room temperature for 5 days. In Test Example 5, an epoxy/polyamine white enamel coating composition (abbreviated to "EP/PA" in Table 1) was applied to a thickness of 50 μm on dry basis and dried at room temperature for one day and a polyol/polyisocyanate white enamel coating composition (abbreviated to "PO/PI" in Table 1) was further applied to the thus formed coating to a thickness of 25 μm on dry basis and room dried at room temperature for 4 days.

Test Examples 7 to 12

Chelate-forming coating compositions B, D, F, H, J and L prepared in Examples 8, 10, 12, 14, 16 and 18 were applied to substrates and dried under the conditions listed below in Table 2. In Test Examples 7, 8 and 10, top coating compositions were applied to the coated substrates and dried to form top coatings. In Test Examples 7 and 8, an acryl/melamine white enamel coating composition (abbreviated to "acryl" in Table 1) was applied to form a top coating 20 μm in thickness on dry basis and baked at 140° C. for 30 minutes. In Test Example 10, the same urethane-based white enamel coating composition as used in Test Example 4 was applied to form a top coating 20 μm in thickness on dry basis and dried at room temperature for 5 days.

Comparative Test Examples 1 to 3

An epoxy/melamine coating composition was applied to each of panels treated with zinc phosphate or chromic acid or untreated panels used in place of panels treated with the present chelate-forming surface treating composition to produce a film having a thickness of 40 μm on dry basis and was baked at 140° C. for 30 minutes.

Comparative Test Example 4

The same acryl/melamine white enamel coating composition as used in Test Example 7 was applied to the coated substrate to a thickness of 20 μm on dry basis and baked at 140° C. for 30 minutes.

Comparative Test Example 5

The same epoxy/polyamine white enamel coating composition as used in Test Example 5 was applied to the coated substrate to a thickness of 30 μm on dry basis and dried at room temperature for one day. The same acryl/melamine white enamel coating composition as used in Test Example 7 was applied to the thus obtained coating to a thickness of 20 μm on dry basis and baked at 140° C. for 30 minutes.

Cross-cut flaws were formed on the coated panels obtained in Test Examples 1 to 12 and Comparative Test Examples 1 to 5 and the cut coated panels were subjected to a salt spray test, filiform corrosion test and outdoor exposure test. Tables 1 and 2 shows the results.

Test methods

Salt spray test (SST)

The coated panels were provided with cross cuts and tested according to JIS Z 2371. The duration of salt spraying was 1000 hours.

Filiform corrosion test (FCT)

Cross-cut flaws were formed on the coated panels, which were then held with the cross-cut coating surface down on the upper portion of a beaker containing 12N hydrochloric acid to expose the cross-cut coating surface to the vapor of hydrochloric acid, the beaker was sealed off and the coating was exposed to the acid vapor for 1 hour. The coated panels were thereafter subjected to a wetting test under the conditions of 50±2° C. and RH of 98±2% for 1000 hours.

Outdoor exposure test (EPT)

Cross-cut flaws were formed on the coated panels and the coated panels were placed on the beach of Chikura, Chiba Prefecture as held with the coating surface directed southward at an angle of 30 degrees for one year according to JIS K 5400 9.9.

The coated panels thus obtained were checked for the width of peeling of the coating and maximum length of corrosion on one side of the cut lines. Tables 1 and 2 show the results.

Tables 1 and 2 reveal that the resins of the invention and the compositions comprising the resin of the invention and a crosslinking agent give various substrates higher corrosion resistance than conventional surface treating compositions and coating compositions.

TABLE 1

| | Test Example Example No. | | | | | |
|---|---|---|---|---|---|---|
| | 1 | 2 | 3 | 4 | 5 | 6 |
| Surface treating composition | A | C | E | G | I | K |

TABLE 1-continued

| Top coating composition | | | | | | |
|---|---|---|---|---|---|---|
| Kind | EP/ME | EP/ME | EP/ME | Urethane | EP/PA + PO/PI | EP/ME |
| Dry thickness (μm) | 40 | 40 | 40 | 20 | 50 + 25 | 40 |
| Substrate, test result | | | | | | |
| Cold-rolled steel panel | | | | | | |
| SST (mm) | 0.2 | 0.5 | 1.2 | 0.7 | 0.1> | 0.1> |
| FCT (mm) | 0.5 | 0.3 | 2.1 | 0.7 | 0.1> | 0.2 |
| EPT (mm) | 0.5 | 1.2 | 2.0 | 1.0 | 0.2 | 0.2 |
| Zn-plated steel panel | | | | | | |
| SST (mm) | 0.1 | 0.1> | 0.3 | 0.4 | 0.6 | 0.1 |
| FCT (mm) | 0.3 | 0.6 | 0.7 | 0.4 | 0.4 | 0.2 |
| EPT (mm) | 0.2 | 0.2 | 1.5 | 0.7 | 1.0 | 0.2 |
| Al panel | | | | | | |
| SST (mm) | 0.1> | 0.1> | 0.1 | 0.1 | 0.1 | 0.1> |
| FCT (mm) | 0.1> | 0.3 | 0.5 | 0.4 | 0.4 | 0.1> |
| EPT (mm) | 1.0 | 1.0 | 1.5 | 0.8 | 0.8 | 0.7 |
| ZnPO$_4$-treated cold-rolled steel panel | | | | | | |
| SST (mm) | 0.1 | 0.1 | 0.4 | 0.3 | 0.1> | 0.1> |
| FCT (mm) | 0.2 | 0.2 | 0.6 | 0.4 | 0.2 | 0.2 |
| EPT (mm) | 0.4 | 0.6 | 1.2 | 0.4 | 0.4 | 0.2 |

| | Comparative Test Example Example No. | | |
|---|---|---|---|
| | 1 | 2 | 3 |
| Treatment | Zinc phosphate | Chromic acid | None |
| Top coating composition | | | |
| Kind | EP/ME | EP/ME | EP/ME |
| Dry thickness (μm) | 40 | 40 | 40 |
| Substrate, test result | | | |
| Cold-rolled steel panel | | | |
| SST (mm) | 4.0 | — | 10 |
| FCT (mm) | 3.8 | — | 7.5 |
| EPT (mm) | 2.7 | — | 6.0 |
| Zn-plates steel panel | | | |
| SST (mm) | 4.0 | — | 6.5 |
| FCT (mm) | 3.2 | — | 4.0 |
| EPT (mm) | 2.5 | — | 5.3 |
| Al panel | | | |
| SST (mm) | — | 0.5 | 0.1 |
| FCT (mm) | — | 1.0 | 15 |
| EPT (mm) | — | 5.0 | 12 |
| ZnPO$_4$-treated cold-rolled steel panel | | | |
| SST (mm) | — | — | — |
| FCT (mm) | — | — | — |
| EPT (mm) | — | — | — |

TABLE 2

| | Test Example Example No. | | | | | |
|---|---|---|---|---|---|---|
| | 7 | 8 | 9 | 10 | 11 | 12 |
| Chelate-forming coating composition or like primer | | | | | | |
| Kind | B | D | F | H | J | L |
| Drying condition | 140° C., 30 min | 140° C., 30 min | r.t., 1 day | r.t., 1 day | r.t., 7 days | 170° C., 30 min |
| Dry thickness (μm) | 30 | 30 | 20 | 15 | 30 | 10 |
| Top coating composition | | | | | | |
| Kind | Acryl | Acryl | — | Urethane | — | — |
| Dry thickness (μm) | 20 | 20 | — | 20 | — | — |
| Substrate, test result | | | | | | |
| Cold-rolled steel panel | | | | | | |
| SST (mm) | 0.3 | 0.5 | 1.5 | 0.6 | 0.1> | 0.6 |
| FCT (mm) | 0.7 | 0.5 | 2.6 | 0.7 | 0.1> | 0.4 |
| EPT (mm) | 0.8 | 1.5 | 2.5 | 1.4 | 0.3 | 1.3 |
| Zn-plated steel panel | | | | | | |
| SST (mm) | 0.1 | 0.2 | 0.9 | 0.3 | 0.2 | 0.2 |
| FCT (mm) | 0.4 | 0.4 | 0.7 | 0.8 | 0.3 | 0.3 |
| EPT (mm) | 0.6 | 1.0 | 1.2 | 0.8 | 1.0 | 0.7 |
| Al panel | | | | | | |
| SST (mm) | 0.1> | 0.1> | 0.2 | 0.2 | 0.1> | 0.1> |
| FCT (mm) | 0.1> | 0.5 | 0.7 | 0.4 | 0.3 | 0.1> |

TABLE 2-continued

| EPT (mm) | 1.5 | 1.5 | 1.5 | 1.1 | 0.8 | 0.8 |
|---|---|---|---|---|---|---|

| | Test Example Example No. | | | | | |
|---|---|---|---|---|---|---|
| | 7 | 8 | 9 | 10 | 11 | 12 |
| Chelate-forming coating composition or like primer | | | | | | |
| Kind | B | D | F | H | J | L |
| Drying condition | 140° C., 30 min | 140° C., 30 min | r.t., 1 day | r.t., 1 day | r.t., 7 days | 170° C., 30 min |
| Dry thickness (μm) | 30 | 30 | 20 | 15 | 30 | 10 |
| Top coating composition | | | | | | |
| Kind | Acryl | Acryl | — | Urethane | — | — |
| Dry thickness (μm) | 20 | 20 | — | 20 | — | — |
| Substrate, test result | | | | | | |
| ZnPO$_4$-treated cold-rolled steel panel | | | | | | |
| SST (mm) | 0.1 | 0.2 | 0.6 | 0.5 | 0.1 | 0.2 |
| FCT (mm) | 0.3 | 0.3 | 0.5 | 0.5 | 0.1 | 0.1 |
| EPT (mm) | 0.5 | 0.7 | 0.7 | 0.4 | 0.2 | 0.3 |
| ZnPO$_4$-treated Zn-plated steel panel | | | | | | |
| SST (mm) | 0.1 | 0.1 | 0.4 | 0.2 | 0.1> | 0.1> |
| FCT (mm) | 0.3 | 0.1 | 0.5 | 0.3 | 0.1 | 0.1> |
| EPT (mm) | 0.4 | 0.5 | 0.6 | 0.7 | 0.2 | 0.2 |
| Chromate-treated Al panel | | | | | | |
| SST (mm) | 0.1> | 0.1> | 0.1> | 0.1> | 0.1> | 0.1> |
| FCT (mm) | 0.1> | 0.1> | 0.2 | 0.2 | 0.1> | 0.1> |
| EPT (mm) | 1.2 | 1.1 | 1.0 | 0.6 | 0.3 | 0.1 |

| | Comparative Test Example Example No. | |
|---|---|---|
| | 4 | 5 |
| Chelate-forming coating composition or like primer | | |
| Kind | — | EP/PA |
| Drying condition | — | r.t., 1 day |
| Dry thickness (μm) | — | 30 |
| Top coating composition | | |
| Kind | Acryl | Acryl |
| Dry thickness (μm) | 20 | 20 |
| Substrate, test result | | |
| Cold-rolled steel panel | | |
| SST (mm) | 21 | 8 |
| FCT (mm) | 15 | 6.5 |
| EPT (mm) | 18 | 6 |
| Zn-plated steel panel | | |
| SST (mm) | 23 | 12 |
| FCT (mm) | 18 | 5 |
| EPT (mm) | 20 | 4 |
| Al panel | | |
| SST (mm) | 0.5 | 0.5 |
| FCT (mm) | 30 | 15 |
| EPT (mm) | 20 | 10 |
| ZnPO$_4$-treated cold-rolled steel panel | | |
| SST (mm) | 16 | 4 |
| FCT (mm) | 9 | 3 |
| EPT (mm) | 9 | 5 |
| ZnPO$_4$-treated Zn-plated steel panel | | |
| SST (mm) | 20 | 3 |
| FCT (mm) | 16 | 3 |
| EPT (mm) | 8 | 5 |
| Chromate-treated Al panel | | |
| SST (mm) | 0.5 | 1 |
| FCT (mm) | 3 | 2 |
| EPT (mm) | 7 | 2 |

Note: "r.t." means room temperature.

Examples Illustrating the Preparation of Resins of the Invention Having a Chelate-Forming Group of the Formula [2], [3] or [4]

EXAMPLE 19

A 159 parts quantity of 1-amino-2-naphthol, 58 parts of N,N-dimethylformamide and 0.1 part of hydroquinone were placed into a flask and heated to 70° C. with stirring to dissolve the 1-amino-2-naphthol. The solution was maintained at 70° C. To the solution was added dropwise a mixture of 72 parts of acrylic acid and 2.3 parts of copper acetate serving as an addition reaction catalyst over a period of 2 hours. After the addition, the mixture was heated to 90° C. and reacted at the same temperature for 3 hours, giving an adduct solution.

Admixed with the solution were 614 parts of a solution previously prepared by mixing 500 parts of EPI-KOTE 1001 (trademark for epoxy resin manufactured by Shell Chemical Co., Ltd. with an epoxy equivalent of about 500) and 114 parts of methyl isobutyl ketone, 3.7 parts of tetraethylammonium bromide, 272.3 parts of isobutyl alcohol and 272.3 parts of methyl isobutyl ketone. The mixture was heated to 110° C. and reacted for 4 hours at the same temperature to obtain a chelate-forming resin solution with a solids content of 50%. The obtained resin had an acid value of less than 1.0. The concentration of the chelate-forming group in the resin was 1.37 moles/kg (resin solids). The resin had a number average molecular weight of about 1500.

EXAMPLE 20

The procedure of Example 2 was repeated with the exception of using 55 parts of 2-amino-1-naphthol in place of 43 parts of 5-methyl-2-aminophenol used in Example 2 and changing the amount of methyl isobutyl ketone from 88.9 parts to 110.9 parts, giving a chelate-forming resin solution having a solids content of 50%. The concentration of the chelate-forming group in the resin was 1.92 moles/kg (resin solids). The resin had a number average molecular weight of about 45000.

EXAMPLE 21

A 159 parts quantity of 3-amino-2-naphthol, 60 parts of methyl isobutyl ketone, 116 parts of 2-hydroxyethyl acrylate and 5 parts of formic acid were placed into a flask and heated to 90° C. The solution was reacted at the same temperature for 5 hours. The reaction mixture was heated to distill off 10 parts of mixture of formic acid and methyl isobutyl ketone under reflux of methyl isobutyl ketone and was cooled. Methyl isobutyl ketone (7.5 parts) was added to give a solution of hydroxyl-containing chelate compound.

Fifty parts of methyl isobutyl ketone was placed into another flask and maintained at 85° C. with heating. Into the flask was placed dropwise a mixture of 50 parts of isocyanatoethyl methacrylate, 30 parts of isobutyl acrylate, 20 parts of styrene and 2 parts of 2,2'-azobisisobutyronitrile over a period of 2 hours while feeding nitrogen gas. After the addition, the mixture was maintained at the same temperature for 2 hours, giving a solution of isocyanate group-containing acrylic resin. To the solution was added 108 parts of the above-obtained hydroxyl-containing chelate compound solution. The mixture was reacted at 70° C. for 2 hours. With the addition of 212 parts of ethylene glycol monomethyl ether, a solution of chelate-forming resin having a solids content of 40% was produced. The concentration of the chelate-forming group in the resin was 1.70 moles/kg (resin solids). The resin had a number average molecular weight of about 32000.

EXAMPLE 22

A 204 parts quantity of 5-nitro-1-amino-2-naphthol, 72 parts of acrylic acid, 97 parts of methyl isobutyl ketone and 1.5 parts of hydroquinone were placed into a flask and reacted at 90° C. for 4 hours. To the reaction mixture were added 142 parts of glycidyl methacrylate, 3.7 parts of tetraethylammonium bromide and 0.1 part of N-nitrosodiphenylamine while blowing air thereinto. The mixture was reacted at 110° C. for 3 hours, giving a solution of chelate-forming group-containing polymerizable unsaturated monomer.

Into another flask were placed 182.8 parts of butyl acetate and 230 parts of methyl isobutyl ketone. The mixture was maintained at 85° C. with heating. Added dropwise was a mixture of 520.3 parts of the solution of chelate-forming group-containing polymerizable unsaturated monomer obtained above, 130 parts of hydroxyethyl methacrylate, 158.6 parts of methyl acrylate, 79.5 parts of acrylonitrile and 9 parts of azobisvaleronitrile over a period of 2 hours while feeding nitrogen gas. After the addition, the mixture was maintained at the same temperature for 2 hours, giving a solution of chelate-forming resin having a solids content of 60%. The concentration of the chelate-forming group in the resin was 1.27 moles/kg (resin solids). The resin had a number average molecular weight of about 15000.

EXAMPLE 23

Into a flask were placed 159 parts of 1-amino-2-naphthol, 46 parts of formic acid, 88.6 parts of tetrahydropyran, 0.2 part of hydroquinone and 150 parts of γ-methacryloyloxypropyltrimethoxysilane. The mixture was reacted at 80° C. for 4 hours, giving a solution of chelate-forming group-containing silane. To the solution were added 951.6 parts of toluene, 680 parts of methyltrimethoxysilane and 324 parts of deionized water. The mixture was subjected to condensation reaction on hydrolysis at 80° C. for 2 hours. The reaction mixture was heated to 118° C. for 2 hours to remove the solvent, whereby 1157.3 parts of the solvent was distilled off, giving a solution of chelate-forming resin having a solids content of 50%. The concentration of the chelate-forming group in the resin was 1.61 moles/kg (resin solids). The resin had a number average molecular weight of about 10000.

EXAMPLE 24

The procedure of Example 6 was repeated with the exception of using 133 parts of 1-amino-2-naphthol in place of 91 parts of o-aminophenol and changing the amount of isopropanol from 43 parts to 85 parts, giving a solution of chelate-forming resin having a solids content of 50%. The concentration of the chelate-forming group in the resin was 1.43 moles/kg (resin solids). The resin had a number average molecular weight of about 3300.

EXAMPLE 25

Four parts of the solution of chelate-forming resin with a solids content of 50% obtained in Example 19 was admixed with 0.7 part of Sumimal M55, 60 parts of methyl isobutyl ketone, 25 parts of ethanol, 9.8 parts of water and 0.5 part of citric acid, giving a surface treating composition A'.

EXAMPLE 26

A coating composition B' was prepared by admixing 35 parts of the solution of chelate-forming resin having a solids content of 50% and obtained in Example 19 with 11 parts of Sumimal M55, 24 parts of methyl isobutyl ketone, 28 parts of isopropanol and 2 parts of water.

EXAMPLE 27

A surface treating composition C' was prepared by admixing 4 parts of the solution of chelate-forming resin having a solids content of 50% and obtained in Example 20 with 0.7 part of Sumimal M55, 60 parts of methyl isobutyl ketone, 25 parts of ethanol, 9.8 parts of water and 0.5 part of citric acid.

EXAMPLE 28

A coating composition D' was prepared by admixing 35 parts of the solution of chelate-forming resin having a solids content of 50% and obtained in Example 20 with 11 parts of Sumimal M55, 24 parts of methyl isobutyl ketone, 28 parts of isopropanol and 2 parts of water.

EXAMPLE 29

A surface treating composition E' was prepared by admixing 12.5 parts of the solution of chelate-forming resin having a solids content of 40% and obtained in Example 21 with 57.5 parts of methyl isobutyl ketone, 20 parts of toluene, 8 parts of ethanol and 2 parts of a 1% aqueous solution of formic acid.

EXAMPLE 30

A coating composition F' was prepared by admixing 50 parts of the solution of chelate-forming resin having a solids content of 50% and obtained in Example 21 with 20 parts of methyl isobutyl ketone, 20 parts of isobutanol, 9 parts of ethanol and 1 part of a 0.5% aqueous solution of citric acid.

EXAMPLE 31

A surface treating composition G' was prepared by admixing 8.5 parts of the solution of chelate-forming resin having a solids content of 60% and obtained in Example 22 with 1.2 parts of isophorone diisocyanate, 40 parts of methyl isobutyl ketone, 10 parts of toluene and 40 parts of butyl acetate.

EXAMPLE 32

A coating composition H' was prepared by admixing 34 parts of the solution of chelate-forming resin having a solids content of 60% and obtained in Example 22 with 5 parts of isophorone diisocyanate, 30 parts of methyl isobutyl ketone, 20 parts of toluene and 10 parts of butyl acetate.

EXAMPLE 33

A surface treating composition I' was prepared by admixing 10 parts of the solution of chelate-forming resin having a solids content of 50% and obtained in Example 23 with 70 parts of isobutyl alcohol, 5 parts of ethanol and 15 parts of toluene.

EXAMPLE 34

Toluene (30 parts), 40 parts of methyl isobutyl ketone and 30 parts of butyl acetate were placed into a flask and maintained at 100° C. with heating. Into the flask was placed dropwise a mixture of 20 parts of γ-methacryloyloxypropyltrimethoxysilane, 60 parts of methyl methacrylate, 20 parts of isobutyl methacrylate and 2 parts of azobisisobutyronitrile over a period of 2 hours. After the addition, the mixture was maintained at the same temperature for 2 hours and 1 part of azobisisobutyronitrile was added. The mixture was maintained at 100° C. for 1 hour, giving a solution of moisture-curable acrylic resin having a solids content of 50%.

The obtained solution of moisture-curable acrylic resin (10 parts) was admixed with 100 parts of titanium white, 30 parts of ethanol, 20 parts of methyl isobutyl ketone and 15 parts of toluene. The mixture was dispersed to give a paste of white pigment 60% in solids content.

A coating composition J' was prepared by uniformly mixing together 105 parts of the above-obtained white pigment paste, 100 parts of the chelate-forming resin solution having a solids content of 50% and obtained in Example 23, 94 parts of the above-obtained moisture-curable acrylic resin solution, 50 parts of ethanol, 100 parts of methyl isobutyl ketone and 51 parts of toluene.

EXAMPLE 35

A self-depositing type surface treating composition K' was prepared by gradually adding, with stirring, 20 parts of the chelate-forming resin solution having a solids content of 50% and obtained in Example 24 to a mixture of 79.5 parts of a 7% aqueous solution of formic acid and 0.5 part of sodium chlorate and homogeneously mixing them.

EXAMPLE 36

A coating composition L' was prepared by gradually adding, with stirring, 40 parts of the chelate-forming resin solution having a solids content of 50% and obtained in Example 24 to 60 parts of a 0.2% aqueous solution of formic acid and homogeneously mixing them.

Test Examples 13 to 18

The surface treating compositions A', C', E', G', I' and K' prepared above in Examples 25, 27, 29, 31, 33 and 35, respectively were applied to the substrates listed below in Table 3 to a thickness Of 0.5 μm on dry basis and air-dried.

In Test Example 18 using the surface treating composition K', a substrate was immersed in the composition K', whereby the composition was self-deposited on the substrate, affording a film of the composition K'. In Test Examples 13 to 17, each surface treating composition was applied by bar coater.

A top coating composition was applied to the thus pretreated panel and was dried to form a top coating. In Test Examples of 13, 14, 15 and 18, an epoxy/melamine coating composition (abbreviated to "EP/ME" in Table 3) was applied to the pretreated panel to a thickness of about 40 μm when dried. The coated panel was baked at 140° C. for 30 minutes for curing. In Test Example 16, a urethane-based white enamel coating composition (abbreviated to "urethane" in Table 3) was applied to the pretreated panel to a thickness of 20 μm on dry basis and dried at room temperature for 5 days. In Test Example 17, an epoxy/polyamine white enamel coating composition (abbreviated to "EP/PA" in Table 3) was applied to the pretreated panel to a thickness of 50 μm on dry basis and dried at room temperature for one day and a polyol/polyisocyanate white enamel coating composition (abbreviated to "PO/PI" in Table 3) was applied to the coating to a thickness of 25 μm on dry basis and dried at room temperature for 4 days.

Test Examples 19 to 24

Chelate-forming coating compositions B', D', F', H', J' and L' prepared in Examples 26, 28, 30, 32, 34 and 36, respectively were applied to the panels and dried under the conditions indicated below in Table 4. In Test Examples 19, 20 and 22, top coating compositions were applied to the coated panels and dried to form a top coating. In Test Examples 19 and 20, an acryl/melamine white enamel coating composition (abbreviated to "acryl" in Table 4) was applied to the coating to a thickness of 20 μm on dry basis and baked at 140° C. for 30 minutes. In Test Example 22, the same urethane-based white enamel coating composition as used in Test Example 16 was applied to form a top coating with a thickness of 20 μm on dry basis and dried at room temperature for 5 days. Chelate-forming coating compositions B', D', F', H' and J' were applied by spray coating and chelate-forming coating composition L' was applied by cationic electrodeposition.

Comparative Test Example 6

The same acryl/melamine white enamel coating composition as used in Test Example 19 was applied to the coated substrate to a thickness of 20 μm on dry basis and baked at 140° C. for 30 minutes.

Comparative Test Example 7

The same epoxy/polyamine white enamel coating composition as used in Test Example 17 was applied to the coated substrate to a thickness of 30 μm on dry basis and dried at room temperature for one day. The same acryl/melamine white enamel coating composition as used in Test Example 7 was applied to the thus obtained coating to a thickness of 20 μm on dry basis and baked at 140° C. for 30 minutes.

Cross-cut flaws were formed on the coated panels obtained in Test Examples 13 to 24 and Comparative Test Examples 1 to 3 and 6 and 7. The salt spray test, filiform corrosion test and outdoor exposure test as stated above were conducted by the same methods as above using cross-cut coated panels. Tables 3 and 4 shows the results.

The coated panels thus obtained were checked for the width of peeling of the coating and maximum length of corrosion on one side of the cut lines. Tables 3 and 4 show the results.

Tables 3 and 4 reveal that the resins of the invention and the compositions each comprising the resin of the invention and a crosslinking agent give various substrates higher corrosion resistance than conventional surface treating compositions and coating compositions.

TABLE 3

| | Test Example Example No. | | | | | |
|---|---|---|---|---|---|---|
| | 13 | 14 | 15 | 16 | 17 | 18 |
| Surface treating composition | A' | C' | E' | G' | I' | K' |
| Top coating composition | | | | | | |
| Kind | EP/ME | EP/ME | EP/ME | Urethane | EP/PA + PO/PI | EP/ME |
| Dry thickness (μm) | 40 | 40 | 40 | 20 | 50 + 25 | 40 |
| Substrate, test result | | | | | | |
| Cold-rolled steel panel | | | | | | |
| SST (mm) | 0.1 | 0.3 | 1.0 | 0.6 | 0.1> | 0.1> |
| FCT (mm) | 0.3 | 0.3 | 1.3 | 0.7 | 0.1> | 0.2 |
| EPT (mm) | 0.4 | 0.7 | 1.3 | 0.9 | 0.1 | 0.2 |
| Zn-plated steel panel | | | | | | |
| SST (mm) | 0.1 | 0.1 | 0.2 | 0.3 | 0.5 | 0.1 |
| FCT (mm) | 0.3 | 0.7 | 0.7 | 0.5 | 0.5 | 0.2 |
| EPT (mm) | 0.3 | 0.2 | 1.0 | 0.5 | 1.0 | 0.2 |
| Al panel | | | | | | |
| SST (mm) | 0.1> | 0.1> | 0.1 | 0.1> | 0.1> | 0.1> |
| FCT (mm) | 0.1> | 0.1 | 0.2 | 0.3 | 0.2 | 0.1> |
| EPT (mm) | 0.8 | 0.7 | 1.0 | 0.5 | 0.6 | 0.7 |
| ZnPO$_4$-treated cold-rolled steel panel | | | | | | |
| SST (mm) | 0.1> | 0.1> | 0.1 | 0.2 | 0.1> | 0.1> |
| FCT (mm) | 0.1 | 0.1 | 0.3 | 0.2 | 0.1 | 0.2 |
| EPT (mm) | 0.2 | 0.3 | 0.5 | 0.2 | 0.2 | 0.2 |

| | Comparative Test Example Example No. | | |
|---|---|---|---|
| | 1 | 2 | 3 |
| Treatment | Zinc phosphate | Chromic acid | None |
| Top coating composition | | | |
| Kind | EP/ME | EP/ME | EP/ME |
| Dry thickness (μm) | 40 | 40 | 40 |
| Substrate, test result | | | |
| Cold-rolled steel panel | | | |
| SST (mm) | 4.0 | — | 10 |
| FCT (mm) | 3.8 | — | 7.5 |
| EPT (mm) | 2.7 | — | 6.0 |
| Zn-plated steel panel | | | |
| SST (mm) | 4.0 | — | 6.5 |
| FCT (mm) | 3.2 | — | 4.0 |
| EPT (mm) | 2.5 | — | 5.3 |
| Al panel | | | |
| SST (mm) | — | 0.5 | 0.1 |
| FCT (mm) | — | 1.0 | 15 |
| EPT (mm) | — | 5.0 | 12 |
| ZnPO$_4$-treated cold-rolled steel panel | | | |
| SST (mm) | — | — | — |
| FCT (mm) | — | — | — |
| EPT (mm) | — | — | — |

TABLE 4

| | Test Example Example No. | | | | | |
|---|---|---|---|---|---|---|
| | 19 | 20 | 21 | 22 | 23 | 24 |
| Chelate-forming coating composition or like primer | | | | | | |
| Kind | B' | D' | F' | H' | J' | L' |
| Drying conditon | 140° C., 30 min | 140° C., 30 min | r.t., 1 day | r.t., 1 day | r.t., 7 days | 170° C., 30 min |
| Dry thickness (μm) | 30 | 30 | 20 | 15 | 30 | 10 |
| Top coating composition | | | | | | |
| Kind | Acryl | Acryl | — | Urethane | — | — |
| Dry thickness (μm) | 20 | 20 | — | 20 | — | — |
| Substrate, test result | | | | | | |
| Cold-rolled steel panel | | | | | | |
| SST (mm) | 0.2 | 0.2 | 0.8 | 0.4 | 0.1> | 0.6 |
| FCT (mm) | 0.3 | 0.1 | 0.9 | 0.3 | 0.1> | 0.4 |
| EPT (mm) | 0.5 | 0.7 | 0.8 | 0.5 | 0.1 | 1.3 |
| Zn-plated steel panel | | | | | | |
| SST (mm) | 0.1> | 0.1 | 0.5 | 0.2 | 0.1 | 0.2 |
| FCT (mm) | 0.2 | 0.2 | 0.3 | 0.4 | 0.2 | 0.3 |
| EPT (mm) | 0.3 | 0.4 | 0.6 | 0.4 | 0.6 | 0.7 |
| Al panel | | | | | | |
| SST (mm) | 0.1> | 0.1> | 0.1 | 0.1 | 0.1> | 0.1> |
| FCT (mm) | 0.1> | 0.2 | 0.3 | 0.2 | 0.1 | 0.1> |
| EPT (mm) | 0.9 | 0.7 | 0.9 | 1.0 | 0.7 | 0.8 |

| | Test Example Example No. | | | | | |
|---|---|---|---|---|---|---|
| | 19 | 20 | 21 | 22 | 23 | 24 |
| Chelate-forming coating composition or like primer | | | | | | |
| Kind | B' | D' | F' | H' | J' | L' |
| Drying conditon | 140° C., 30 min | 140° C., 30 min | r.t., 1 day | r.t., 1 day | r.t., 7 days | 170° C., 30 min |
| Dry thickness (μm) | 30 | 30 | 20 | 15 | 30 | 10 |
| Top coating composition | | | | | | |
| Kind | Acryl | Acryl | — | Urethane | — | — |
| Dry thickness (μm) | 20 | 20 | — | 20 | — | — |
| Substrate, test result | | | | | | |
| ZnPO$_4$-treated cold-rolled steel panel | | | | | | |
| SST (mm) | 0.1> | 0.1 | 0.3 | 0.2 | 0.1> | 0.2 |
| FCT (mm) | 0.2 | 0.2 | 0.2 | 0.3 | 0.1> | 0.1 |
| EPT (mm) | 0.3 | 0.3 | 0.3 | 0.2 | 0.1> | 0.3 |
| ZnPO$_4$-treated Zn-plated steel panel | | | | | | |
| SST (mm) | 0.1> | 0.1> | 0.2 | 0.2 | 0.1> | 0.1> |
| FCT (mm) | 0.2 | 0.1> | 0.3 | 0.2 | 0.1> | 0.1> |
| EPT (mm) | 0.2 | 0.3 | 0.2 | 0.4 | 0.2 | 0.2 |
| Chromate-treated Al panel | | | | | | |
| SST (mm) | 0.1> | 0.1> | 0.1> | 0.1> | 0.1> | 0.1> |
| FCT (mm) | 0.1> | 0.1> | 0.1 | 0.1 | 0.1> | 0.1> |
| EPT (mm) | 0.9 | 0.7 | 0.5 | 0.5 | 0.1> | 0.1 |

| | Comparative Test Example Example No. | |
|---|---|---|
| | 6 | 7 |
| Chelate-forming coating composition or like primer | | |
| Kind | — | EP/PA |
| Drying conditon | — | r.t., 1 day |
| Dry thickness (μm) | — | 30 |
| Top coating compositon | | |
| Kind | Acryl | Acryl |
| Dry thickness (μm) | 20 | 20 |
| Substrate, test result | | |
| Cold-rolled steel panel | | |
| SST (mm) | 21 | 8 |
| FCT (mm) | 15 | 6.5 |
| EPT (mm) | 18 | 6 |
| Zn-plates steel panel | | |
| SST (mm) | 23 | 12 |
| FCT (mm) | 18 | 5 |
| EPT (mm) | 20 | 4 |
| Al panel | | |
| SST (mm) | 0.5 | 0.5 |
| FCT (mm) | 30 | 15 |
| EPT (mm) | 20 | 10 |

TABLE 4-continued

| ZnPO4-treated cold-rolled steel panel | | |
|---|---|---|
| SST (mm) | 16 | 4 |
| FCT (mm) | 9 | 3 |
| EPT (mm) | 9 | 5 |
| ZnPO4-treated Zn-plated steel panel | | |
| SST (mm) | 20 | 3 |
| FCT (mm) | 16 | 3 |
| EPT (mm) | 8 | 5 |
| Chromate-treted Al panel | | |
| SST (mm) | 0.5 | 1 |
| FCT (mm) | 3 | 2 |
| EPT (mm) | 7 | 2 |

Examples Illustrating the Formation of Electrophoretic Coatings by the Method of the Invention
Preparation Example of Pretreating Compositions Preparation Example 1

A treating solution (1) was prepared by admixing 20 parts of the chelate-forming resin solution 50% in solids content and obtained in Example 2 with 600 parts of ethylene glycol monoethyl ether and 380 parts of deionized water.

Preparation Example 2

Into a flask were placed 180 parts of the adduct solution (B) obtained in Example 2, 55.3 parts of 2-amino-3-naphthol, 22 parts of dimethyl formamide and 16 parts of formic acid. The mixture was reacted at 50° C. for 8 hours and admixed with 119.3 parts of methyl isobutyl ketone, giving a solution of chelate-forming resin having a solids content of 50%. The concentration of the chelate-forming group in the resin was 1.18 moles/kg (resin solids). The resin had a number average molecular weight of about 45000.

Admixed with 16 parts of the above-obtained solution of chelate-forming resin were 2 parts of CYMEL 303 (trademark for methylated melamine resin manufactured by Mitsui Cyanamide Co., Ltd.), 0.4 part of NA-CURE 5225 (trademark for neutralization product of dodecylbenzenesulfonic acid with amine manufactured by King Co., Ltd., U.S.), 600 Warts of ethylene glycol monoethyl ether and 381.6 parts of deionized water, giving a treating solution (2).

Preparation Example 3

A flask was charged with 32 parts of n-butyl alcohol, 1 part of tetraethylammonium bromide and 18 parts of acrylic acid. The mixture was heated to 110° C. while blowing air thereinto and maintained at the same temperature. Into the flask was placed dropwise 125 parts of the resin solution (A) prepared in Example 2 over a period of 1 hour. After the addition, the mixture was maintained at the same temperature for 2 hours and 14 parts of phthalic anhydride was added. The mixture was maintained at 110° C. for 2 hours, giving a solution of an adduct having a polymerizable unsaturated group and carboxyl group.

The adduct solution was cooled to 50° C. Admixed with the solution were 39.8 parts of 2-amino-1-naphthol and 24.4 parts of dimethylformamide. The mixture was reacted at 50° C. for 12 hours. With the addition of 89.4 parts of methyl isobutyl ketone, a solution of chelate-forming resin having a solids content of 50% was produced. The concentration of the chelate-forming group in the resin was 1.46 moles/kg (resin solids). The resin had a number average molecular weight of about 43000.

A treating solution (3) was prepared by admixing 20 parts of the obtained solution of chelate-forming resin with 1 part of triethylamine and 979 parts of deionized water.

Preparation Example 4

A flask was charged with 439.7 parts of methyl isobutyl ketone, 512 parts of acrylic acid, 19.8 parts of tetraethylammonium bromide and 2.0 parts of N-nitrosodiphenylamine. The mixture was heated to 108° C. and maintained at the same temperature. Into the flask was placed dropwise a homogeneous solution containing 55.5 parts of methyl isobutyl ketone and 1469 parts of DENACOL EX 521 (trademark for polyolpolyglycidyl ether manufactured by Nagase Kasei Co., Ltd. with an average molecular weight of about 1200 and an epoxy equivalent of about 200) over a period of 2 hours. After the addition, the mixture was maintained at the same temperature for 3 hours, giving a polymerizable unsaturated group-containing adduct solution with a solids content of 80%. The resin in the solution had an acid value of less than 0.1.

The obtained adduct solution (66.1 parts) was admixed with 17.2 parts of 4-chloro-2-aminophenol, 8.7 parts of formic acid, 19.1 parts of N-dimethylformamide, 7.2 parts of diethanolamine, 0.1 part of hydroquinone and 4.4 parts of ethylene glycol monopropyl ether. The mixture was reacted at 70° C. for 2 hours. Added thereto was 92.1 parts of ethylene glycol monopropyl ether, giving a chelate-forming resin solution having a solids content of 40%. The concentration of the chelate-forming group in the resin was 1.55 moles/kg (resin solids). The resin had a number average molecular weight of about 2400.

The obtained chelate-forming resin solution (25 parts) was homogeneously mixed with 0.6 part of benzyl alcohol and 40 parts of deionized water. The mixture was added dropwise to a mixture of 890.2 parts of deionized water, 11.4 parts of a 10% aqueous solution of formic acid and 33.4 parts of a 0.2% aqueous solution of nitrous acid and homogeneously mixed therewith to give a treating solution (4).

Preparation Example 5

A flask was charged with 72 parts of acrylic acid, 2 parts of tetraethylammonium bromide, 0.3 part of hydroquinone and 31.7 parts of methyl isobutyl ketone. The mixture was maintained at 110° C. with heating. Into the flask was placed dropwise a homogeneous mixture containing 220 parts of EPIKOTE 180S90 (trademark for novolak-type epoxy resin manufactured by Yuka Shell Epoxy Co., Ltd.) and 314.3 parts of methyl ethyl ketone over a period of 1 hour. After the addition, the mixture was held at the same temperature for 2 hours.

Next, the mixture was cooled to 70° C. and admixed with 199 parts of the partially blocked polyisocyanate solution prepared in Example 6. The mixture was reacted at 70° C. for 3 hours to introduce a blocked isocyanate group into the resin. Added thereto were 127 parts of 1-amino-2--naphthol, 50 parts of dibutylamine and 60 parts of acetic acid. The mixture was reacted at 70° C. for 3 hours. Thereafter 232.6 parts of ethylene glycol monoethyl ether was admixed with the mixture, giving a chelate-forming resin solution with a solids content of 50%. The concentration of the chelate-forming group in the resin was 1.53 moles/kg (resin solids). The resin had a number average molecular weight of about 2700.

The obtained chelate-forming resin solution (100 parts) was admixed with 900 parts of a 2% aqueous solution of formic acid, giving a treating solution (5).

Preparation Example 6

Ten parts of the chelate-forming resin solution having a solids content of 50% and prepared in Example 6 was gradually added with stirring to a mixture of 89.7 parts of a 3.5% aqueous solution of formic acid and 0.3 part of sodium chlorate, and homogenously mixed therewith, giving a treating solution (6).

EXAMPLEs 37 to 42

The treating solutions (1) to (6) prepared in Preparation Examples 1 to 6 were applied to the following substrates by methods described below to form a film of treating agent.

Substrates
*Cold-rolled dull-finish steel panel, 0.8 m/m
*Iron-zinc alloy plated steel panel, 0.8 m/m
*Aluminum panel, 0.8 m/m
*Zinc phosphate-treated cold-rolled steel panel [(treated with PALBOND 3020 (trademark for a zinc phosphate treating agent manufactured by Nihon Parkerizing Co., Ltd.)], 0.8 m/m Method of forming a film of treating agent Example 37: application with bar coater/air-drying/washing with water Example 38: application with bar coater/baking (140° C., 20 min)/washing with water Example 39: dip coating/air-drying/washing with water Example 40: self-deposition by dipping/washing with water/air-drying Example 41: spin coating (in which an excess of treating agent is removed by centrifugal force)/air-drying/washing with water Example 42: self-deposition by dipping/washing with water/baking (170° C., 20 min)

An electrophoretic coating was produced on the film of treating agent formed on the substrate.

The electrodeposition was conducted by the following method.

In Examples 37, 38, 40, 41 and 42, cationic electrodeposition was carried out by applying ELECRON No. 9410, gray (trademark for a cationic electrophoretic coating composition manufactured by Kansai Paint Co., Ltd., epoxypolyamine resin/blocked polyisocyanate, gray coating composition, abbreviated to "Cation-1" in Tables 5 and 6) to the treated panel surface at a voltage of 250 V to a thickness of 20 μm. Thereafter the coated panel was washed with water and baked at 170° C. for 30 minutes to obtain an electrophoretically coated panel.

In Example 39, anionic electrodeposition was performed by applying ELECRON No.7100, gray (trademark for an anionic electrophoretic coating composition manufactured by Kansai Paint Co., Ltd., maleinized polybutadiene resin-based, gray coating composition, abbreviated to "Anion-2" in Table 5) to the treated panel surface at a voltage of 200 V to a thickness of 20 μm. Thereafter the coated panel was washed with water and baked at 160° C. for 30 minutes to obtain an electrophoretically coated panel.

Comparative Example 1

Cationic electrodeposition was conducted in the same manner as in Example 37 with the exception of using a zinc phosphate-treated panel (treated with PALBOND 3020) in lieu of using the panel treated with the chelate-forming surface treating composition.

Comparative Example 2

Cationic electrodeposition was performed in the same manner as in Example 37 with the exception of using a panel treated with chromic acid in place of the panel treated with the chelate-forming surface treating composition.

Comparative Example 3

Cationic electrodeposition was performed in the same manner as in Example 37 with the exception of using an untreated panel in place of the panel treated with the chelate-forming surface treating composition.

In Comparative Examples 1 to 3, the electrophoretically coated panels were washed with water and baked at 170° C. for 30 minutes to provide panels with cationically electrophoretic coating.

The electrophoretically coated panels obtained in Examples 37 to 42 and Comparative Examples 1 to 3 were tested for finishing appearance, salt spray resistance, resistance to warm salt water immersion and impact resistance. Table 5 shows the results.

The performance tests were conducted with the results in Table 5 by the following methods.

Test Methods

Finishing appearance

The electrophoretically coated surface was inspected with the unaided eye to assess the surface state in terms of seeding, craters and surface smoothness. The results were evaluated according to the following criteria: "A" for a good result, "B" for orange peel appearing but negligibly for use and "C" for an unsatisfactory result.

Salt spray resistance

The coated panel was provided with cross cuts and tested according to JIS Z 2371. The duration of salt spraying was 240 hours. A cellophane adhesive tape was adhered to the cross-cut surface and forcibly peeled off. The coated panels were checked for the width of peeling of the coating and maximum length of corrosion on one side of the cut lines.

Resistance to warm salt water immersion

The coated panel was provided with cross cuts and dipped in 5% salt water at 50° C. for 240 hours. The coated panel was withdrawn and air-dried. A cellophane adhesive tape was adhered to the cross-cut surface and forcibly peeled off. The coated panels were checked for the width of peeling of the coating and maximum length of corrosion on one side of the cut lines.

Impact resistance

Du Pont impact test was conducted according to JIS K 5400 8.3.2 (1990) in an atmosphere held at 20° C. A weight of 500 g (0.5 inch in tip diameter) was dropped onto the coated surface to determine the maximum height which permitted dropping without causing damage to the coating.

The maximum height was 50 cm.

In the cationic electrodeposition to coat cold-rolled steel panels in Examples 37, 38, 40, 41 and 42 and Comparative Examples 1 and 3, investigations were carried out to assess the electrodeposition characteristic (relationship between the voltage applied at a bath temperature of 30° C. and the obtained maximum film thickness, coulomb yield) afforded by the electrodeposition. Table 6 below shows the results.

TABLE 5

|  | Example | | | | | |
|---|---|---|---|---|---|---|
|  | 37 | 38 | 39 | 40 | 41 | 42 |
| Treating agent | | | | | | |
| Kind | (1) | (2) | (3) | (4) | (5) | (6) |
| Coating method | Bar coater | Bar coater | Dip coating | Self-deposition | Spin coating | Self-deposition |
| Film thickness (μm) | 0.3 | 0.3 | 0.5 | 1.0 | 0.5 | 1.5 |
| Electorphoretic coating composition Kind | Cation-1 | Cation-1 | Anion-2 | Cation-1 | Cation-1 | Cation-1 |
| Cold-rolled steel panel | | | | | | |
| Finishing appearance | A | A | A | A | A | A |
| Salt spray resistance (mm) | 0.5 | 0.5 | 1.5 | 0.5 | 0.5 | 0.5 |
| Warm salt water resistance (mm) | 0.5 | 0.5 | 1.5 | 0.2 | 0.5 | 0.1 |
| Impact resistance (cm) | 50 | 50 | 50 | 50 | 50 | 50 |
| Fe—Zn alloy-plated steel panel | | | | | | |
| Finishing appearance | A | A | B | B | B | B |
| Salt spray resistance (mm) | 0.5 | 0.5 | 1.0 | 0.5 | 0.5 | 0.5 |
| Warm salt water resistance (mm) | 0.5 | 0.5 | 1.5 | 0.5 | 0.5 | 0.5 |
| Impact resistance (cm) | 50 | 50 | 50 | 50 | 50 | 50 |
| Al panel | | | | | | |
| Finishing appearance | A | A | A | A | A | A |
| Salt spray resistance (mm) | 0.1 | 0.1 | 0.5 | 0.1 | 0.1 | 0.1 |
| Warm salt water resistance (mm) | 0.1 | 0.1 | 0.5 | 0.1 | 0.1 | 0.1 |
| Impact resistance (cm) | 20 | 20 | 20 | 20 | 20 | 20 |
| ZnPO₄-treated cold-rolled panel | | | | | | |
| Finishing appearance | A | A | A | A | A | A |
| Salt spray resistance (mm) | 0 | 0 | 0 | 0 | 0 | 0 |
| Warm salt water resistance (mm) | 0.1 | 0.1 | 0.5 | 0.1 | 0.1 | 0.1 |
| Impact resistance (cm) | 50 | 50 | 50 | 50 | 50 | 50 |

|  | Comparative Example | | |
|---|---|---|---|
|  | 1 | 2 | 3 |
| Treatment | Zinc phosphate | Chromic acid | None |
| Electrophoretic coating composition Kind | Cation-1 | Cation-1 | Cation-1 |
| Cold-rolled steel panel | | | |
| Finishing appearance | A | — | A |
| Salt spray resistance (mm) | 0.5 | — | 3.0 |
| Warm salt water resistance (mm) | 0.1 | — | 3.0 |
| Impact resistance (cm) | 50 | — | 50 |
| Fe—Zn alloy-plated steel panel | | | |
| Finishing appearance | A | — | B |
| Salt spray resistance (mm) | 0.5 | — | 2.0 |
| Warm salt water resistance (mm) | 0.5 | — | 3.0 |
| Impact resistance (cm) | 50 | — | 50 |
| Al panel | | | |
| Finishing appearance | — | A | A |
| Salt spray resistance (mm) | — | 0.1 | 0.5 |
| Warm salt water resistance (mm) | — | 0.1 | 0.5 |
| Impact resistance (cm) | — | 20 | 20 |
| ZnPO₄-treated cold-rolled panel | | | |
| Finishing appearance | — | — | — |
| Salt spray resistance (mm) | — | — | — |
| Warm salt water resistance (mm) | — | — | — |
| Impact resistance (cm) | — | — | — |

TABLE 6

|  | Example | | | | |
|---|---|---|---|---|---|
|  | 37 | 38 | 40 | 41 | 42 |
| Treated panel | | | | | |
| Substrate Kind | Cold-rolled steel panel | Cold-rolled steel panel | Cold-rolled steel panel | Cold-rolled steel panel | Cold-rolled steel panel |
| Treating agent Kind | (1) | (2) | (4) | (5) | (6) |
| Film thickness (μm) | 0.3 | 0.3 | 1.0 | 0.5 | 1.5 |
| Electrophoretic coating composition Kind | Cation-1 | Cation-1 | Cation-1 | Cation-1 | Cation-1 |

TABLE 6-continued

| Electrodeposition characteristics | | | | | |
|---|---|---|---|---|---|
| Maximum thickness of electrophoretic coating (μm) | | | | | |
| 200 V | 21 | 20 | 20 | 21 | 20 |
| 250 V | 25 | 25 | 26 | 25 | 25 |
| 300 V | 28 | 29 | 29 | 29 | 29 |
| Coulomb yield (mg/C) | 32 | 32 | 32 | 32 | 32 |

| | Comparative Example | |
|---|---|---|
| | 1 | 3 |
| Treatment | ZnPO$_4$-treated cold-rolled steel panel | Untreated |
| Electrophoretic coating composition Kind | Cation-1 | Cation-1 |
| Electrodeposition characteristics | | |
| Maximum thickness of electrophoretic coating (μm) | | |
| 200 V | 20 | 21 |
| 250 V | 24 | 26 |
| 300 V | 28 | 30 |
| Coulomb yield (mg/C) | 32 | 33 |

We claim:

1. A film-formable, chelate-forming resin having, per 1000 g of the resin, about 0.2 to about 3.5 moles of a chelate-forming group of the formula:

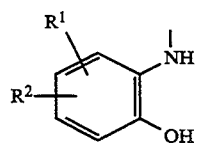

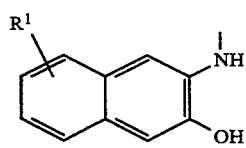

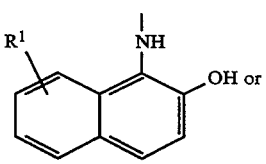

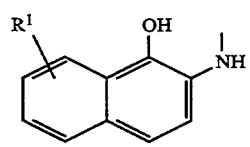

wherein $R^1$ and $R^2$ are the same or different and each represents a hydrogen atom, a halogen atom, a nitro group, a nitroso group, a cyano group, a hydrocarbon group having up to 18 carbon atoms, or an alkoxyalkyl group having up to 12 carbon atoms, said resin having been prepared by the addition of an amine of formula:

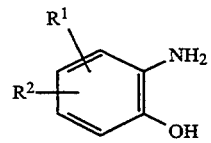

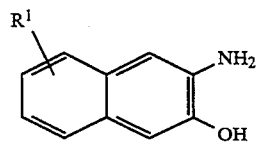

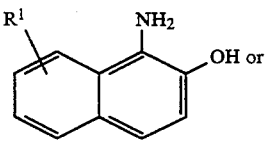

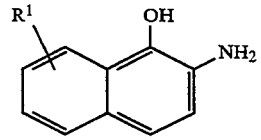

wherein $R^1$ and $R^2$ are as defined above, to a resin or a compound having a polymerizable double bond to attach the amino group to the polymerizable double bond.

2. A chelate-forming resin according to claim 1 which has a number average molecular weight of about 500 to about 500000.

3. A chelate-forming resin according to claim 1 which is formed from a base resin selected from acrylic resin, epoxy resin, polyester resin, alkyd resin and silicon-containing resin.

4. A metal surface treating composition containing the chelate-forming resin as defined in claim 1.

5. A corrosion preventive coating composition containing the chelate-forming resin as defined in claim 1.

6. A chelate-forming resin composition comprising the chelate-forming resin as defined in claim 1 and a crosslinking agent.

7. A method for forming an electrophoretic coating, comprising the steps of bringing the metal surface treating composition of claim 4 into contact with a metal surface before electrodeposition on the metal surface to accomplish pretreatment, and conducting electrodeposition on the pretreated metal surface.

* * * * *